(12) United States Patent
Elliott et al.

(10) Patent No.: US 7,979,096 B1
(45) Date of Patent: *Jul. 12, 2011

(54) ENERGY EFFICIENT FORWARDING IN AD-HOC WIRELESS NETWORKS

(75) Inventors: Brig Barnum Elliott, Arlington, MA (US); David Spencer Pearson, Bennington, VT (US)

(73) Assignee: Tri-County Excelsior Foundation, Marshall, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/253,130

(22) Filed: Oct. 16, 2008

Related U.S. Application Data

(63) Continuation of application No. 12/174,512, filed on Jul. 16, 2008, which is a continuation of application No. 10/328,566, filed on Dec. 23, 2002, now Pat. No. 7,421,257, which is a continuation-in-part of application No. 09/998,946, filed on Nov. 30, 2001, now Pat. No. 7,020,501.

(51) Int. Cl.
*H04M 1/00* (2006.01)
*H04B 1/38* (2006.01)

(52) U.S. Cl. .......... 455/572; 455/574.1; 455/127.5; 455/343.2; 455/343.4

(58) Field of Classification Search .......... 455/574, 455/343.2, 343.4; 709/237
See application file for complete search history.

(56) References Cited

U.S. PATENT DOCUMENTS

| | | | |
|---|---|---|---|
| 3,192,230 A | 6/1965 | Lunsford et al. | 260/326.5 |
| 5,247,285 A | 9/1993 | Yokota et al. | 345/169 |
| 5,297,142 A | 3/1994 | Paggeot et al. | 370/85.6 |
| 5,307,297 A | 4/1994 | Iguchi et al. | 364/708.1 |
| 5,371,734 A | 12/1994 | Fischer | 370/18 |
| 5,371,764 A | 12/1994 | Gillingham et al. | 375/106 |
| 5,481,265 A | 1/1996 | Russell | 341/22 |
| 5,515,369 A | 5/1996 | Flammer, III et al. | 370/69.1 |
| 5,517,505 A | 5/1996 | Buchholz et al. | 370/105.1 |
| 5,528,587 A | 6/1996 | Garland et al. | 370/60 |
| 5,541,912 A | 7/1996 | Choudhury et al. | 370/17 |
| 5,583,866 A | 12/1996 | Vook et al. | 370/312 |
| 5,598,419 A | 1/1997 | Weigand et al. | 370/514 |
| 5,602,841 A | 2/1997 | Lebizay et al. | 370/413 |
| 5,604,735 A | 2/1997 | Levinson et al. | 370/360 |

(Continued)

FOREIGN PATENT DOCUMENTS

EP 1 022 876 7/2000

(Continued)

OTHER PUBLICATIONS

Van Dyck, R.E. et al. Distributed Sensor Processing Over an Ad Hoc Wireless Network: Simulation Framework and Performance Criteria. NIST, May 2001.

(Continued)

*Primary Examiner* — Patrick N Edouard
*Assistant Examiner* — Julio Perez
(74) *Attorney, Agent, or Firm* — Patrick E. Caldwell, Esq.; The Caldwell Firm, LLC

(57) ABSTRACT

A system for conserving energy in a multi-node network (110) includes nodes (205) configured to organize themselves into tiers (305, 310, 315). The nodes (205) are further configured to produce a transmit/receive schedule at a first tier (310) in the network (110) and control the powering-on and powering-off of transmitters and receivers in nodes (205) in a tier adjacent (315) to the first tier (310) according to the transmit/receive schedule.

146 Claims, 18 Drawing Sheets

U.S. PATENT DOCUMENTS

| | | | | |
|---|---|---|---|---|
| 5,649,119 | A | 7/1997 | Kondoh et al. | 395/250 |
| 5,680,768 | A | 10/1997 | Park | 326/86 |
| 5,696,765 | A | 12/1997 | Safadi | 370/436 |
| 5,699,357 | A | 12/1997 | Carvey | 370/347 |
| 5,721,733 | A | 2/1998 | Wang et al. | 370/332 |
| 5,737,328 | A | 4/1998 | Norman et al. | 370/331 |
| 5,752,202 | A | 5/1998 | Obright | 455/574 |
| 5,781,028 | A | 7/1998 | Decuir | 326/30 |
| 5,832,492 | A | 11/1998 | Wooten | 707/101 |
| 5,848,064 | A | 12/1998 | Cowan | 370/338 |
| 5,857,080 | A | 1/1999 | Jander et al. | 395/307 |
| 5,896,375 | A | 4/1999 | Dent et al. | 370/347 |
| 5,903,777 | A | 5/1999 | Brief | 395/880 |
| 5,909,183 | A | 6/1999 | Borgstahl et al. | 340/825.22 |
| 5,933,611 | A | 8/1999 | Shakkarwar | 395/306 |
| 5,974,327 | A | 10/1999 | Agrawal et al. | 455/452 |
| 6,000,011 | A | 12/1999 | Freerksen et al. | 711/118 |
| 6,005,854 | A | 12/1999 | Xu et al. | 370/335 |
| 6,005,869 | A | 12/1999 | Sakai et al. | 370/452 |
| 6,011,486 | A | 1/2000 | Casey | 340/825.44 |
| 6,011,784 | A | 1/2000 | Brown et al. | 370/329 |
| 6,026,297 | A | 2/2000 | Haartsen | 455/426 |
| 6,052,779 | A | 4/2000 | Jackson et al. | 713/2 |
| 6,061,687 | A | 5/2000 | Wooten | 707/101 |
| 6,067,301 | A | 5/2000 | Aatresh | 370/418 |
| 6,069,896 | A | 5/2000 | Borgstahl et al. | 370/401 |
| 6,079,033 | A | 6/2000 | Jacobson, Jr. et al. | 714/47 |
| 6,094,435 | A | 7/2000 | Hoffman et al. | 370/414 |
| 6,097,707 | A | 8/2000 | Hodzic et al. | 370/321 |
| 6,097,733 | A | 8/2000 | Basu et al. | 370/468 |
| 6,115,390 | A | 9/2000 | Chuah | 370/443 |
| 6,128,290 | A | 10/2000 | Carvey | 370/347 |
| 6,128,492 | A | 10/2000 | Chung | 455/435 |
| 6,192,230 | B1 | 2/2001 | Van Bokhorst et al. | 455/343 |
| 6,208,247 | B1 | 3/2001 | Agre et al. | 340/539 |
| 6,249,740 | B1 | 6/2001 | Ito et al. | 701/207 |
| 6,256,682 | B1 | 7/2001 | Gudan et al. | 710/14 |
| 6,272,140 | B1 | 8/2001 | LaRowe et al. | 370/403 |
| 6,272,567 | B1 | 8/2001 | Pal et al. | 710/56 |
| 6,279,060 | B1 | 8/2001 | Luke et al. | 710/64 |
| 6,282,183 | B1 | 8/2001 | Harris et al. | 370/338 |
| 6,292,508 | B1 | 9/2001 | Hong et al. | 375/134 |
| 6,314,091 | B1 | 11/2001 | LaRowe et al. | 370/338 |
| 6,331,972 | B1 | 12/2001 | Harris et al. | 370/313 |
| 6,351,468 | B1 | 2/2002 | LaRowe et al. | 370/449 |
| 6,381,467 | B1 | 4/2002 | Hill et al. | 455/519 |
| 6,414,955 | B1 | 7/2002 | Clare et al. | 370/390 |
| 6,415,342 | B1 | 7/2002 | Wahl et al. | 710/100 |
| 6,421,347 | B1 | 7/2002 | Borgstahl et al. | 370/401 |
| 6,424,623 | B1 | 7/2002 | Borgstahl et al. | 370/230 |
| 6,434,158 | B1 | 8/2002 | Harris et al. | 370/401 |
| 6,434,159 | B1 | 8/2002 | Woodward et al. | 370/401 |
| 6,487,180 | B1 | 11/2002 | Borgstahl et al. | 370/310 |
| 6,492,904 | B2 | 12/2002 | Richards | 340/539 |
| 6,505,052 | B1 | 1/2003 | Jou | 455/466 |
| 6,532,220 | B1 | 3/2003 | Carneal et al. | 370/329 |
| 6,535,947 | B1 | 3/2003 | Amoni et al. | 710/305 |
| 6,564,074 | B2 | 5/2003 | Romans | 455/574 |
| 6,570,857 | B1 | 5/2003 | Haartsen et al. | 370/312 |
| 6,574,266 | B1 | 6/2003 | Haartsen | 375/133 |
| 6,590,928 | B1 | 7/2003 | Haartsen | 375/134 |
| 6,593,768 | B1 | 7/2003 | Iyer et al. | 326/30 |
| 6,633,753 | B1 | 10/2003 | Kido | 455/343.2 |
| 6,694,149 | B1* | 2/2004 | Ady et al. | 455/522 |
| 6,697,649 | B1 | 2/2004 | Bennett et al. | 455/574 |
| 6,704,293 | B1 | 3/2004 | Larsson et al. | 370/255 |
| 6,715,071 | B2 | 3/2004 | Ono et al. | 713/100 |
| 6,721,273 | B1 | 4/2004 | Lyon | 370/235 |
| 6,748,451 | B2 | 6/2004 | Woods et al. | 709/248 |
| 6,754,188 | B1* | 6/2004 | Garahi et al. | 370/328 |
| 6,760,584 | B2 | 7/2004 | Jou | 455/434 |
| 6,775,258 | B1 | 8/2004 | Van Valkenburg et al. | 370/338 |
| 6,789,196 | B1 | 9/2004 | Miyano | 713/189 |
| 6,804,232 | B1 | 10/2004 | Donaghey | 370/389 |
| 6,807,163 | B1 | 10/2004 | Shi | 370/337 |
| 6,859,831 | B1 | 2/2005 | Gelvin et al. | 709/224 |
| 6,901,465 | B2 | 5/2005 | Kamihara et al. | 710/100 |
| 6,977,895 | B1 | 12/2005 | Shi et al. | 370/235 |
| 7,020,501 | B1 | 3/2006 | Elliott et al. | 455/574 |
| 7,020,701 | B1 | 3/2006 | Gelvin et al. | 709/224 |
| 7,035,240 | B1* | 4/2006 | Balakrishnan et al. | 370/338 |
| 7,218,633 | B2 | 5/2007 | Donaghey | 370/389 |
| 7,386,003 | B1 | 6/2008 | Donaghey | 370/450 |
| 7,421,257 | B1 | 9/2008 | Elliott | 455/127.5 |
| 2001/0029178 | A1 | 10/2001 | Criss et al. | 455/419 |
| 2002/0082035 | A1 | 6/2002 | Aihara et al. | 455/518 |
| 2002/0184385 | A1* | 12/2002 | Kato | 709/237 |
| 2003/0012168 | A1 | 1/2003 | Elson et al. | 370/338 |
| 2003/0066090 | A1 | 4/2003 | Traw et al. | 725/114 |
| 2003/0119568 | A1 | 6/2003 | Menard | 455/572 |
| 2003/0146871 | A1 | 8/2003 | Karr et al. | 342/457 |
| 2004/0196784 | A1* | 10/2004 | Larsson et al. | 370/228 |
| 2006/0246869 | A1* | 11/2006 | Ohlenbusch et al. | 455/343.2 |

FOREIGN PATENT DOCUMENTS

| | | |
|---|---|---|
| EP | 1 102 454 | 5/2001 |
| WO | 96/14697 | 5/1996 |
| WO | 99/14898 | 3/1999 |
| WO | 00/68811 | 11/2000 |
| WO | 2005/005126 | 1/2005 |

OTHER PUBLICATIONS

Office Action dated Nov. 2, 2007, U.S. Appl. No. 10/786,335.
Office Action dated Nov. 16, 2007, U.S. Appl. No. 10/649,030.
Office Action Summary from U.S. Appl. No. 09/998,946 mailed on Oct. 5, 2004.
Office Action Summary from U.S. Appl. No. 09/998,946 mailed on May 18, 2005.
Notice of Allowance from U.S. Appl. No. 09/998,946 mailed on Oct. 26, 2005.
Office Action Summary from U.S. Appl. No. 10/328,566 mailed on Jun. 29, 2005.
Final Office Action Summary from U.S. Appl. No. 10/328,566 mailed on Jan. 12, 2006.
Office Action Summary from U.S. Appl. No. 10/328,566 mailed on Apr. 21, 2006.
Office Action Summary from U.S. Appl. No. 10/328,566 mailed on Oct. 18, 2006.
Office Action Summary from U.S. Appl. No. 10/328,566 mailed on Jun. 15, 2007.
Office Action Summary from U.S. Appl. No. 10/328,566 mailed on Dec. 13, 2007.
Notice of Allowance from U.S. Appl. No. 10/328,566 mailed on May 15, 2008.
U.S. Appl. No. 12/537,010, filed Aug. 6, 2009.
U.S. Appl. No. 12/537,085, filed Aug. 6, 2009.
U.S. Appl. No. 12/174,512, filed Jul. 16, 2008.
Office Action Summary from U.S. Appl. No. 12/174,512 mailed on Mar. 9, 2009.
Specification of the Bluetooth System, vol. I, Dec. 1, 1999.
Specification of the Bluetooth System, vol. II, Dec. 1, 1999.
Barber et al. Designing for Wireless LAN Communications. IEEE Circuits and Devices. 4:12, 29-33 (1996).
Carvey, P. Technology for the Wireless Interconnection of Wearable Personal Electronic Accessories. VLSI Signal Processing IX, IEEE Press. pp. 13-22 (1996).
Retrieved Feb. 9, 2006 from http://www.unf.edu/ccec/ieee/prev_mesa_1998.html. 1988 IEEE Computer Elements MESA Workshop (1998).
Retrieved Feb. 9, 2006 from http://www.wlan01.wpi.edu/scripts/history.html. The Third IEEE Workshop on Wireless LANs: History.
LaRowe, R., "PAN Feasibility: The BodyLAN™ Experience," GTE Internetworking—BBN Technologies, Mar. 1998.
Barber, Jr., Thomas J. Paper submitted to MIT. BodyLAN™: A Low-Power Communications System. Feb. 1996.
Contract No. N3998-96-C-5021 (1996).
Amendment to Contract No. N3998-96-C-5021 (1997).
Retrieved from http://www.nap.edu. 1997 Energy-Efficient Technologies for the Dismounted Soldier pp. 65-111 (1997).
Kardach, "Bluetooth Architecture Overview," Intel Corporation, 1998.

Navarro, M. Fernandez, Simulation of Heterogeneous Optical Channel for Indoor Wireless Infrared Communications, Proc. of Melecon '96, May 13-16, 1996, Bari, Italy, p. 1035-1038.

Boch, Erik, High Bandwith MM-Wave Indoor Wireless Local Area Networks, Microwave Journal, Jan. 1996, p. 152, 154-8.

Bers, Joshua, A Body Model Server for Human Motion Capture and Representation, Presence, vol. 5, No. 4, Fall 1996, p. 381-392.

Universal Serial Bus Specification, Revision 1.1, Compaq, Intel, Microsoft, NEC, Sep. 23, 1998.

Venkat Iyer—Intel Corporation, USB Engineering Change Notice—USB Cable Parameters, USB Specification Rev 1.1, Oct. 7, 1999.

Universal Serial Bus Specification 2.0 (draft 0.79), Oct. 5, 1999, p. 151.

Draft, An Introduction to USB 2.0—Draft 0.9 (1999).

Universal Serial Bus: Plug-and-Play C Single PC (Part 1 of 2); Technical Perspective, www.cypress.com/design/techarticles/v3n1p4.html, Aug. 16, 1999.

Universal Serial Bus: Plug-and-Play Connectivity for Multiple Peripherals on Single PC (Part 2 of 2); Technical Perspective, www.cypress.com/design/techarticles/v3n1p5.html, Aug. 16, 1999.

Universal Serial Bus Specification 2.0, Apr. 2000.

Office Action Summary from U.S. Appl. No. 10/894,406 mailed on Oct. 21, 2005.

Notice of Allowance from U.S. Appl. No. 10/894,406 mailed on Dec. 27, 2006.

Office Action Summary from U.S. Appl. No. 09/535,591 mailed on Sep. 10, 2003.

Notice of Allowance from U.S. Appl. No. 09/535,591 mailed on Feb. 10, 2004.

Office Action Summary from U.S. Appl. No. 09/536,191 mailed on Dec. 15, 2004.

Office Action Summary from U.S. Appl. No. 09/536,191 mailed on Jun. 29, 2005.

Office Action Summary from U.S. Appl. No. 09/536,191 mailed on Oct. 17, 2005.

Office Action Summary from U.S. Appl. No. 09/536,191 mailed on Feb. 6, 2007.

Office Action Summary from U.S. Appl. No. 09/536,191 mailed on Aug. 7, 2007.

Notice of Allowance from U.S. Appl. No. 09/536,191 mailed on Feb. 6, 2008.

U.S. Appl. No. 12/699,836, filed Feb. 3, 2010.

U.S. Appl. No. 12/699,842, filed Feb. 3, 2010.

U.S. Appl. No. 12/699,846, filed Feb. 3, 2010.

Office Action Summary from U.S. Appl. No. 12/537,010 dated Dec. 21, 2010.

Office Action Summary from U.S. Appl. No. 12/537,085 dated Feb. 1, 2011.

Goyal, Ravender et al., MCM Design Methodology for Portable Wireless Communication Systems Design, Proc. of the SPIE, 1996, vol. 2794, p. 230-233.

Butterfly Wireless Connectivity for Interactive Multimedia, Spec Sheet, Butterfly Communications Inc., 1997.

Butterfly Wireless RF Solution, Spec Sheet, Butterfly Communications Inc., Nov. 1997.

* cited by examiner

US 7,979,096 B1

ENERGY EFFICIENT FORWARDING IN AD-HOC WIRELESS NETWORKS

CROSS-REFERENCE TO RELATED APPLICATIONS

The present application is a continuation of U.S. patent application Ser. No. 12/174,512 filed Jul. 16, 2008, which, in turn, is a continuation of U.S. patent application Ser. No. 10/328,566 filed Dec. 23, 2002, now U.S. Pat. No. 7,421,257, which, in turn, is a continuation-in-part of U.S. patent application Ser. No. 09/998,946 filed Nov. 30, 2001, now U.S. Pat. No. 7,020,501, the entire contents of all of which are incorporated herein by reference.

FIELD OF THE INVENTION

The present invention relates generally to ad-hoc, multi-node wireless networks and, more particularly, to systems and methods for implementing energy efficient data forwarding mechanisms in such networks.

BACKGROUND OF THE INVENTION

Recently, much research has been directed towards the building of networks of distributed wireless sensor nodes. Sensor nodes in such networks conduct measurements at distributed locations and relay the measurements, via other sensor nodes in the network, to one or more measurement data collection points. Sensor networks, generally, are envisioned as encompassing a large number (N) of sensor nodes (e.g., as many as tens of thousands of sensor nodes), with traffic flowing from the sensor nodes into a much smaller number (K) of measurement data collection points using routing protocols. These routing protocols conventionally involve the forwarding of routing packets throughout the sensor nodes of the network to distribute the routing information necessary for sensor nodes to relay measurements to an appropriate measurement data collection point.

A key problem with conventional sensor networks is that each sensor node of the network operates for extended periods of time on self-contained power supplies (e.g., batteries or fuel cells). For the routing protocols of the sensor network to operate properly, each sensor node must be prepared to receive and forward routing packets at any time. Each sensor node's transmitter and receiver, thus, conventionally operates in a continuous fashion to enable the sensor node to receive and forward the routing packets essential for relaying measurements from a measuring sensor node to a measurement data collection point in the network. This continuous operation depletes each node's power supply reserves and, therefore, limits the operational life of each of the sensor nodes.

Therefore, there exists a need for mechanisms in a wireless sensor network that enable the reduction of sensor node power consumption while, at the same time, permitting the reception and forwarding of the routing packets necessary to implement a distributed wireless network.

SUMMARY OF THE INVENTION

Systems and methods consistent with the present invention address this need and others by providing mechanisms that enable sensor node transmitters and receivers to be turned off, and remain in a "sleep" state, for substantial periods, thus, increasing the energy efficiency of the nodes. Systems and methods consistent with the present invention further implement transmission and reception schedules that permit the reception and forwarding of packets containing routing, or other types of data, during short periods when the sensor node transmitters and receivers are powered up and, thus, "awake." The present invention, thus, increases sensor node operational life by reducing energy consumption while permitting the reception and forwarding of the routing messages needed to self-organize the distributed network.

In accordance with the purpose of the invention as embodied and broadly described herein, a method of conserving energy in a node in a wireless network includes receiving a first powering-on schedule from another node in the network, and selectively powering-on at least one of a transmitter and receiver based on the received first schedule.

In another implementation consistent with the present invention, a method of conveying messages in a sensor network includes organizing a sensor network into a hierarchy of tiers, transmitting one or more transmit/receive scheduling messages throughout the network, and transmitting and receiving data messages between nodes in adjacent tiers based on the one or more transmit/receive scheduling messages.

In a further implementation consistent with the present invention, a method of conserving energy in a multi-node network includes organizing the multi-node network into tiers, producing a transmit/receive schedule at a first tier in the network, and controlling the powering-on and powering-off of transmitters and receivers in nodes in a tier adjacent to the first tier according to the transmit/receive schedule.

In yet another implementation consistent with the present invention, a method of forwarding messages at a first node in a network includes receiving scheduling messages from a plurality of nodes in the network, selecting one of the plurality of nodes as a parent node, and selectively forwarding data messages to the parent node based on the received scheduling message associated with the selected one of the plurality of nodes.

BRIEF DESCRIPTION OF THE DRAWINGS

The accompanying drawings, which are incorporated in and constitute a part of this specification, illustrate an embodiment of the invention and, together with the description, explain the invention. In the drawings.

DETAILED DESCRIPTION

The following detailed description of the invention refers to the accompanying drawings. The same reference numbers in different drawings identify the same or similar elements. Also, the following detailed description does not limit the invention. Instead, the scope of the invention is defined by the appended claims.

Systems and methods consistent with the present invention provide mechanisms for conserving energy in wireless nodes by transmitting scheduling messages throughout the nodes of the network. The scheduling messages include time schedules for selectively powering-on and powering-off node transmitters and receivers. Message datagrams and routing messages may, thus, be conveyed throughout the network during appropriate transmitter/receiver power-on and power-off intervals.

Exemplary Network

Figure 1:
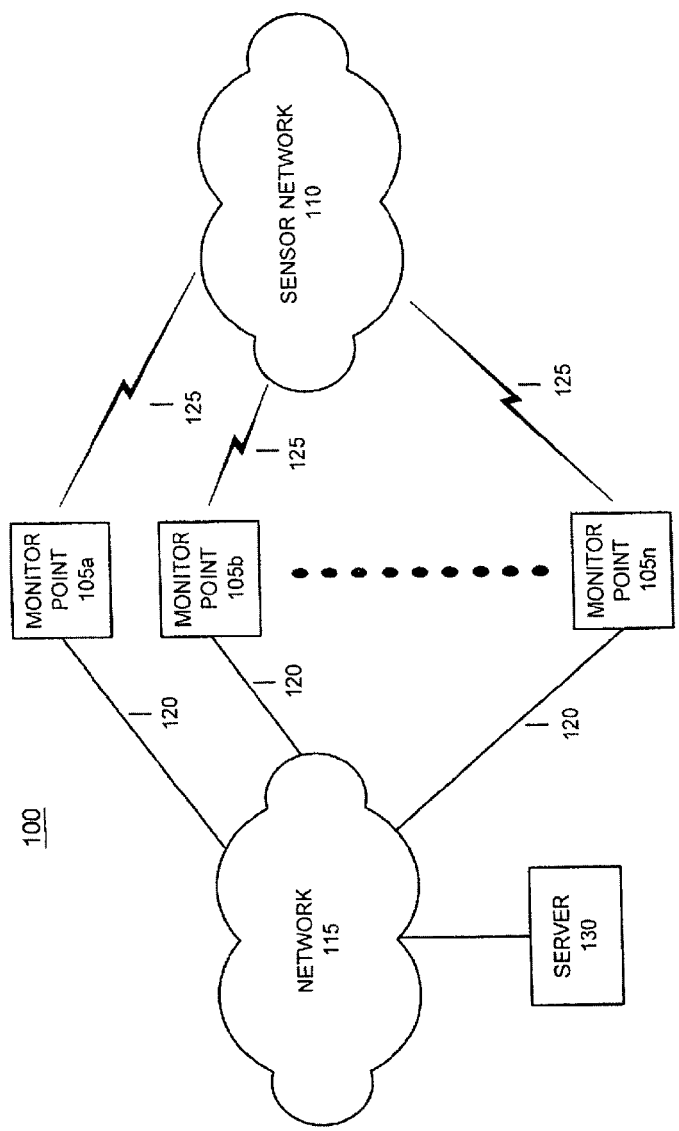
FIG. 1 illustrates an exemplary network consistent with the present invention.

FIG. 1 illustrates an exemplary network 100, consistent with the present invention. Network 100 may include monitor points 105a-105n connected to sensor network 110 and network 115 via wired 120, wireless 125, or optical connection links (not shown). Network 100 may further include one or more servers 130 interconnected with network 115.

Monitor points 105a-105n may include data transceiver units for transmitting messages to, and receiving messages from, one or more sensors of sensor network 110. Such messages may include routing messages containing network routing data, message datagrams containing sensor measurement data, and schedule messages containing sensor node transmit and receive scheduling data. The routing messages may include identification data for one or more monitor points, and the number of hops to reach each respective identified monitor point, as determined by a sensor node/monitor point that is the source of the routing message. The routing messages may be transmitted as wireless broadcast messages in network 100. The routing messages, thus, permit sensor nodes to determine a minimum hop path to a monitor point in network 100. Through the use of routing messages, monitor points 105a-105n may operate as "sinks" for sensor measurements made at nearby sensor nodes. Message datagrams may include sensor measurement data that may be transmitted to a monitor point 105a-105n for data collection. Message datagrams may be sent from a monitor point to a sensor node, from a sensor node to a monitor point, or from a sensor node to a sensor node.

Sensor network 110 may include one or more distributed sensor nodes (not shown) that may organize themselves into an ad-hoc, multi-hop wireless network. Each of the distributed sensor nodes of sensor network 110 may include one or more of any type of conventional sensing device, such as, for example, acoustic sensors, motion-detection sensors, radar sensors, sensors that detect specific chemicals or families of chemicals, sensors that detect nuclear radiation or biological agents, magnetic sensors, electronic emissions signal sensors, thermal sensors, and visual sensors that detect or record still or moving images in the visible or other spectrum. Sensor nodes of sensor network 110 may perform one or more measurements over a sampling period and transmit the measured values via packets, datagrams, cells or the like to monitor points 105a-105n.

Network 115 may include one or more networks of any type, including a Public Land Mobile Network (PLMN), Public Switched Telephone Network (PSTN), local area network (LAN), metropolitan area network (MAN), wide area network (WAN), Internet, or Intranet. The one or more PLMNs may further include packet-switched sub-networks, such as, for example, General Packet Radio Service (CPRS), Cellular Digital Packet Data (CDPD), and Mobile IP sub-networks.

Server 130 may include a conventional computer, such as a desktop, laptop or the like. Server 130 may collect data, via network 115, from each monitor point 105 of network 100 and archive the data for future retrieval.

Exemplary Sensor Network

Figure 2:
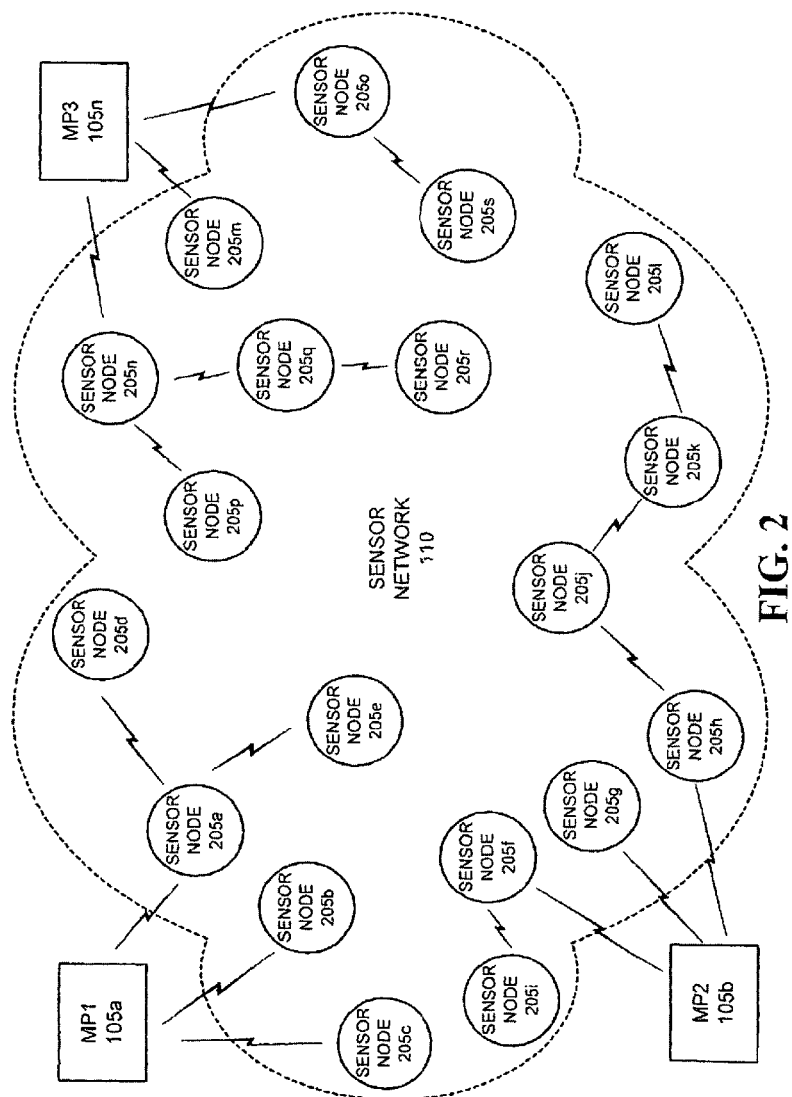
FIG. 2 illustrates an exemplary sensor network consistent with the present invention.

FIG. 2 illustrates an exemplary sensor network 110 consistent with the present invention. Sensor network 110 may include one or more sensor nodes 205a-205s that may be distributed across a geographic area. Sensor nodes 205a-205s may communicate with one another, and with one or more monitor points 105a-105n, via wireless or wire-line links (not shown), using, for example, packet-switching mechanisms. Using techniques such as those described in co-pending patent application Ser. No. 09/999/353, entitled "Systems and Methods for Scalable Routing in Ad-Hoc Wireless Sensor Networks" and filed Nov. 15, 2001 (the disclosure of which is incorporated by reference herein), sensor nodes 205a-205s may organize themselves into an ad-hoc, multi-hop wireless network through the communication of routing messages and message datagrams.

Figure 3:
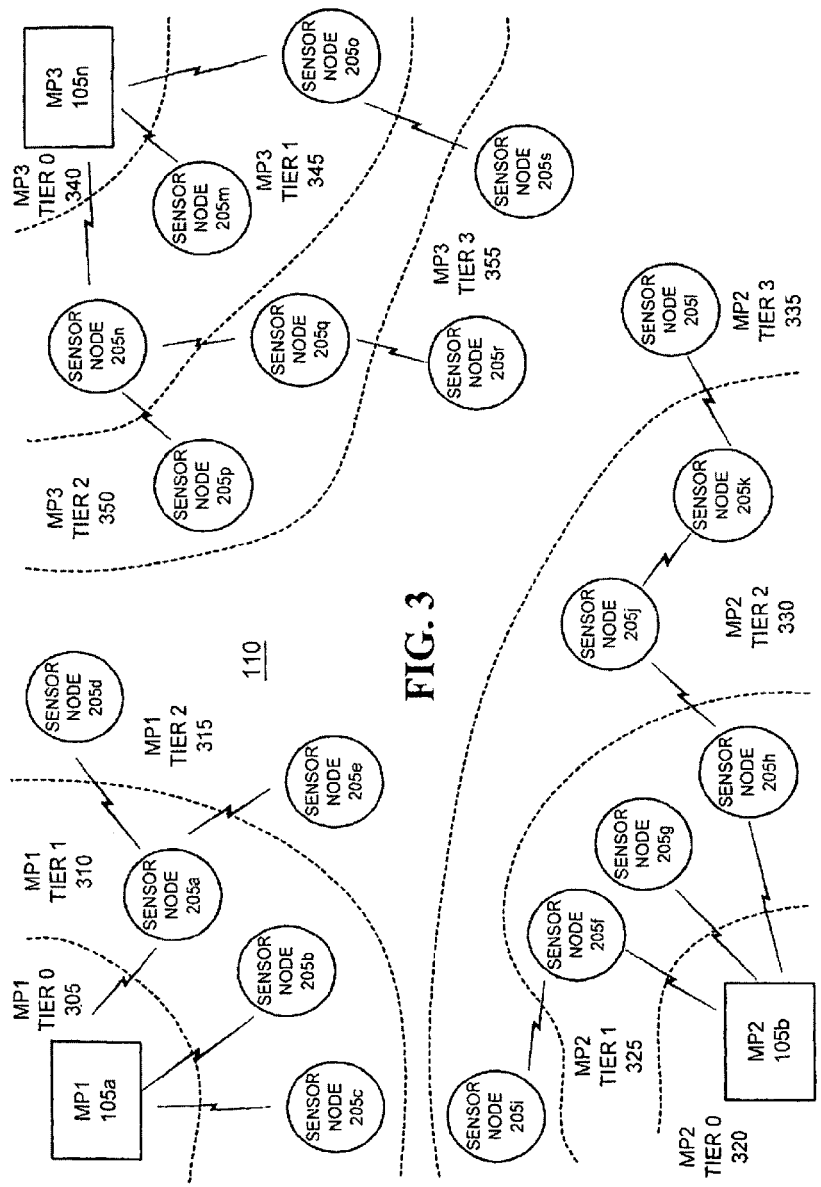
FIG. 3 illustrates the exemplary sensor network of FIG. 2 organized into tiers consistent with the present invention.

FIG. 3 illustrates sensor network 110 self-organized into tiers using conventional routing protocols, or the routing protocol described in the above-described co-pending patent application Ser. No. 09/999/353. When organized into tiers, messages may be forwarded, hop by hop through the network, from monitor points to sensor nodes, or from individual sensor nodes to monitor points that act as "sinks" for nearby sensor nodes. As shown in the exemplary network configuration illustrated in FIG. 3, monitor point MP1 105a may act as a "sink" for message datagrams from sensor nodes 205a-205e, monitor point MP2 105b may act as a "sink" for message datagrams from sensor nodes 205f-205l, and monitor point MP3 105n may act as a "sink" for message datagrams from sensor nodes 205m-205s.

As further shown in FIG. 3, monitor point MP1 105a may reside in MP1 tier 0 305, sensor nodes 205a-205c may reside in MP1 tier 1 310, and sensor nodes 205d-205e may reside in MP1 tier 2 315. Monitor point MP2 105b may reside in MP2 tier 0 320, sensor nodes 205f-205h may reside in MP2 tier 1 325, sensor nodes 205i-205k may reside in MP2 tier 2 330 and sensor node 2051 may reside in MP2 tier 3 335. Monitor point MP3 105n may reside in MP3 tier 0 340, sensor nodes 205m-205o may reside in MP3 tier 1 345, sensor nodes 205p-205q may reside in MP3 tier 2 350 and sensor nodes 205r-205s may reside in MP3 tier 3 355. Each tier shown in FIG. 3 represents an additional hop that data must traverse when traveling from a sensor node to a monitor point, or from a monitor point to a sensor node. At least one node in any tier may act as a "parent" for nodes in the next higher tier (e.g., MP1 Tier 2 315). Thus, for example, sensor node 205a acts as a "parent" node for sensor nodes 205d-205e. Sensor nodes 205d-205e may relay all messages through sensor node 205a to reach monitor point MP1 105a.

Exemplary Sensor Node

Figure 4:
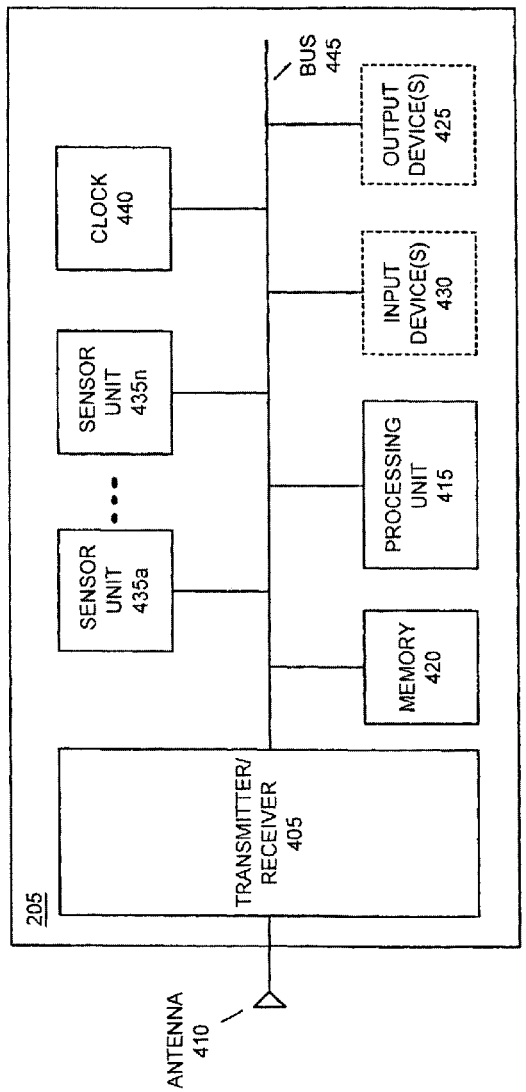
FIG. 4 illustrates exemplary components of a sensor node consistent with the present invention.

FIG. 4 illustrates exemplary components of a sensor node 205 consistent with the present invention. Sensor node 205 may include a transmitter/receiver 405, an antenna 410, a processing unit 415, a memory 420, an optional output device(s) 425, an optional input device(s) 430, one or more sensor units 435a-435n, a clock 440, and a bus 445.

Transmitter/receiver 405 may connect sensor node 205 to a monitor point 105 or another sensor node. For example, transmitter/receiver 405 may include transmitter and receiver circuitry well known to one skilled in the art for transmitting and/or receiving data bursts via antenna 410.

Processing unit 415 may perform all data processing functions for inputting, outputting and processing of data including data buffering and sensor node control functions. Memory 420 may include random access memory (RAM) and/or read only memory (ROM) that provides permanent, semi-permanent, or temporary working storage of data and instructions for use by processing unit 415 in performing processing functions. Memory 420 may also include large-capacity storage devices, such as magnetic and/or optical recording devices. Output device(s) 425 may include conventional mechanisms for outputting data in video, audio and/or hard copy format. For example, output device(s) 425 may include a conventional display for displaying sensor measurement data. Input device(s) 430 may permit entry of data into sensor node 205. Input device(s) 430 may include, for example, a touch pad or keyboard.

Sensor units 435a-435n may include one or more of any type of conventional sensing device, such as, for example, acoustic sensors, motion-detection sensors, radar sensors, sensors that detect specific chemicals or families of chemicals, sensors that detect nuclear radiation or sensors that detect biological agents such as anthrax. Each sensor unit 435a-435n may perform one or more measurements over a sampling period and transmit the measured values via packets, cells, datagrams, or the like to monitor points 105a-105n. Clock 440 may include conventional circuitry for maintaining a time base to enable the maintenance of a local time at sensor node 205. Alternatively, sensor node 205 may derive a local time from an external clock signal, such as, for example, a GPS signal, or from an internal clock synchronized to an external time base.

Bus 445 may interconnect the various components of sensor node 205 and permit them to communicate with one another.

Exemplary Monitor Point

Figure 5:
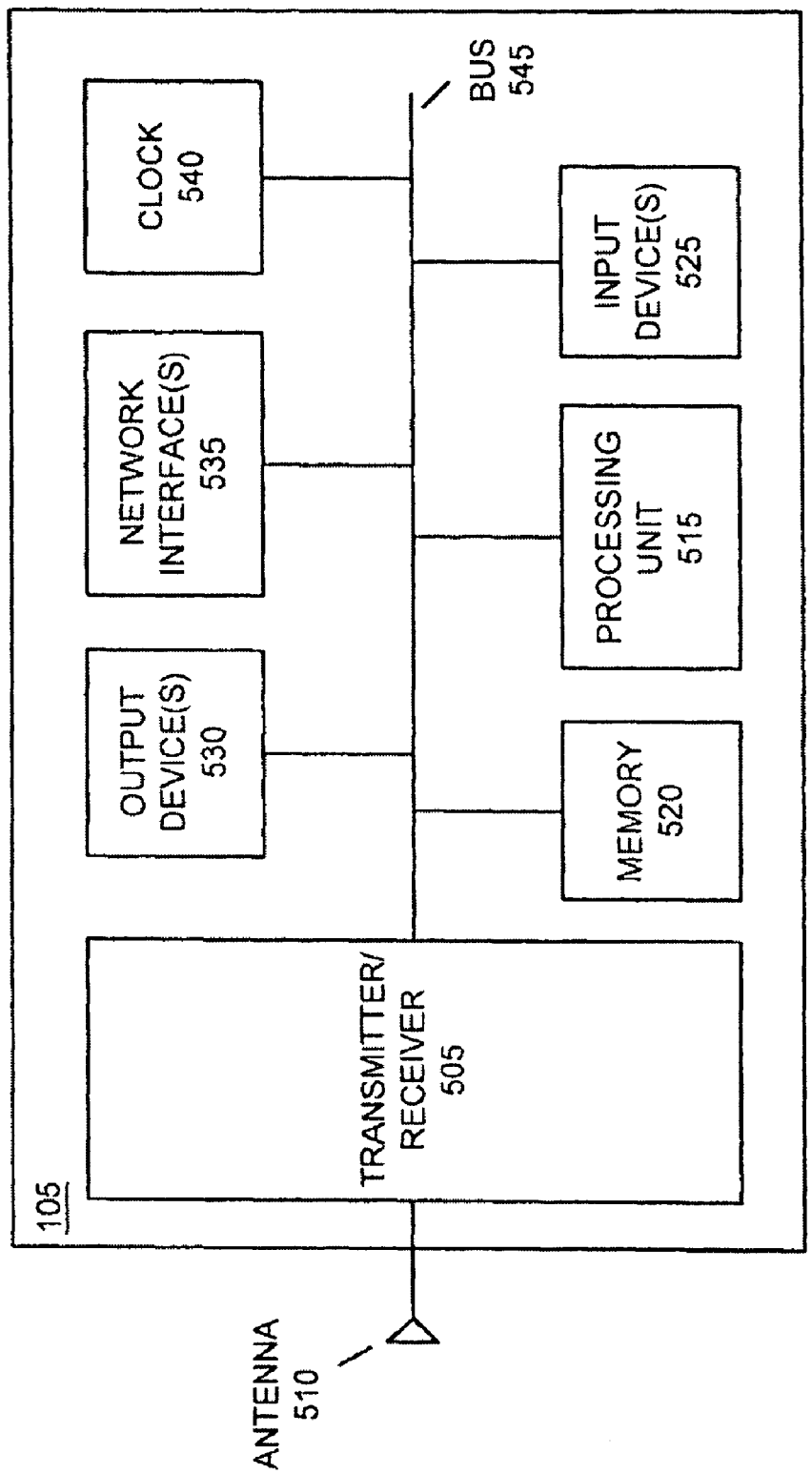
FIG. 5 illustrates exemplary components of a monitor point consistent with the present invention.

FIG. 5 illustrates exemplary components of a monitor point 105 consistent with the present invention. Monitor point 105 may include a transmitter/receiver 505, an antenna 510, a processing unit 515, a memory 520, an input device(s) 525, an output device(s) 530, network interface(s) 535, a clock 540, and a bus 545.

Transmitter/receiver 505 may connect monitor point 105 to another device, such as another monitor point or one or more sensor nodes. For example, transmitter/receiver 505 may include transmitter and receiver circuitry well known to one skilled in the art for transmitting and/or receiving data bursts via antenna 510.

Processing unit 515 may perform all data processing functions for inputting, outputting, and processing of data. Memory 520 may include Random Access Memory (RAM) that provides temporary working storage of data and instructions for use by processing unit 515 in performing processing functions. Memory 520 may additionally include Read Only Memory (ROM) that provides permanent or semi-permanent storage of data and instructions for use by processing unit 515. Memory 520 can also include large-capacity storage devices, such as a magnetic and/or optical device.

Input device(s) 525 permits entry of data into monitor point 105 and may include a user interface (not shown). Output device(s) 530 permits the output of data in video, audio, or hard copy format. Network interface(s) 535 interconnects monitor point 105 with network 115. Clock 540 may include conventional circuitry for maintaining a time base to enable the maintenance of a local time at monitor point 105. Alternatively, monitor point 105 may derive a local time from an external clock signal, such as, for example, a GPS signal, or from an internal clock synchronized to an external time base.

Bus 545 interconnects the various components of monitor point 105 to permit the components to communicate with one another.

Exemplary Monitor Point Database

Figure 6A:
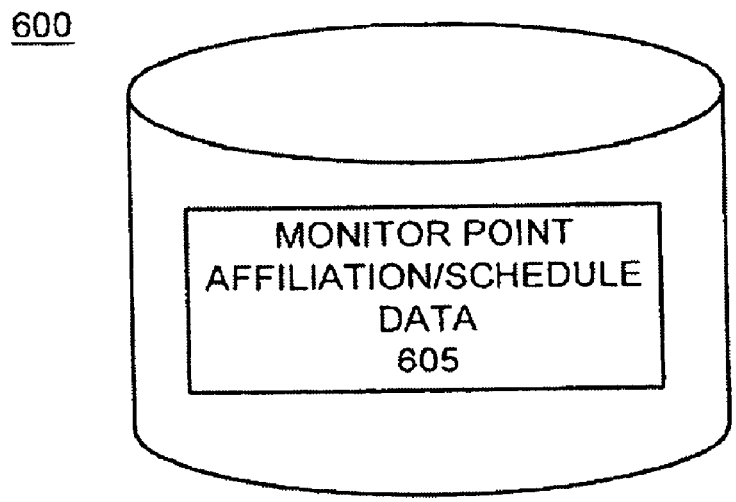
FIG. 6A illustrates an exemplary monitor point database consistent with the present invention.
Figure 6B:
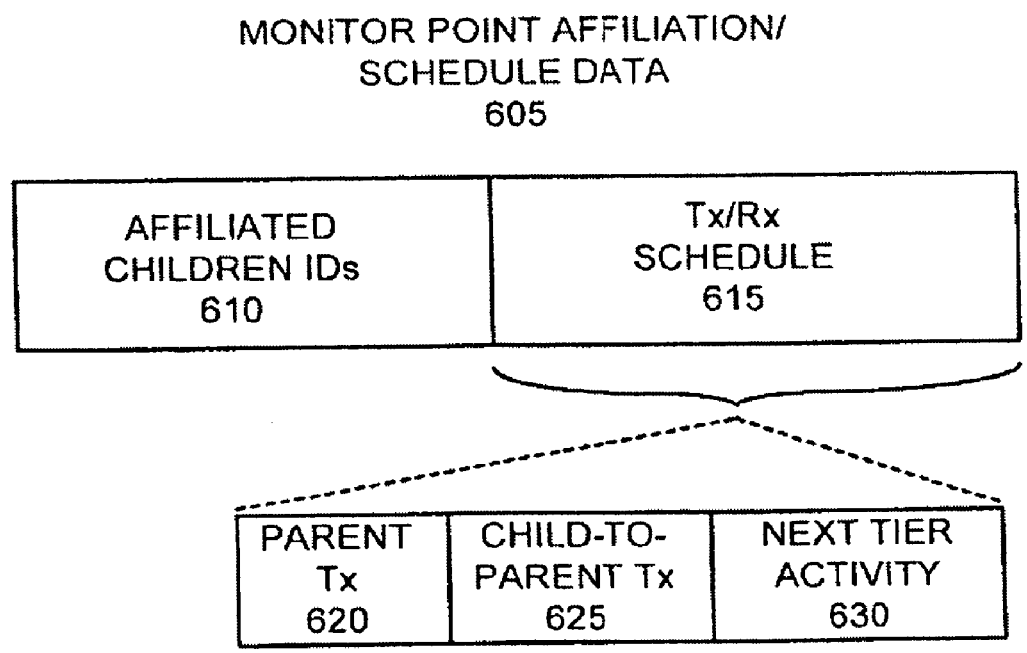
FIG. 6B illustrates exemplary monitor point affiliation/schedule data stored in the database of FIG. 6A consistent with the present invention.

FIG. 6A illustrates an exemplary database 600 that may be stored in memory 520 of a monitor point 105. Database 600 may include monitor point affiliation/schedule data 605 that includes identifiers of sensor nodes affiliated with monitor point 105, and scheduling data indicating times at which monitor point 105 may transmit to, or receive bursts of data from, affiliated sensor nodes. FIG. 6B illustrates exemplary data that may be contained in monitor point affiliation/schedule data 605. Monitor point affiliation/schedule data 605 may include "affiliated children IDs" data 610 and "Tx/Rx schedule" data 615. "Tx/Rx schedule" data 615 may further include "parent Tx" 620 data, "child-to-parent Tx" data 625, and "next tier activity" data 630.

"Affiliated children IDs" data 610 may include unique identifiers of sensor nodes 205 that are affiliated with monitor point 105 and, thus, from which monitor point 105 may receive messages. "Parent Tx" data 620 may include a time at which monitor point 105 may transmit messages to sensor nodes identified by the "affiliated children IDs" data 610. "Child-to-Parent Tx" data 625 may include times at which sensor nodes identified by "affiliated children IDs" 610 may transmit messages to monitor point 105. "Next Tier Activity" data 630 may include times at which sensor nodes identified by the "affiliated children IDs" data 610 may transmit messages to, and receive messages from, their affiliated children.

Exemplary Sensor Node Database

Figure 7A:
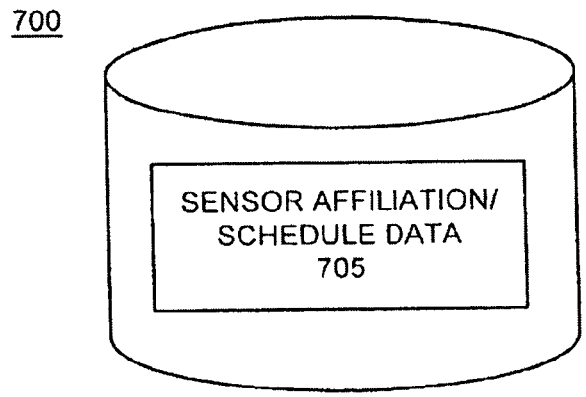
FIG. 7A illustrates an exemplary sensor node database consistent with the present invention.

FIG. 7A illustrates an exemplary database 700 that may be stored in memory 420 of a sensor node 205. Database 700 may include sensor affiliation/schedule data 705 that may further include data indicating which sensor nodes are affiliated with sensor node 205 and indicating schedules for sensor node 205 to transmit and receive messages.

Figure 7B:
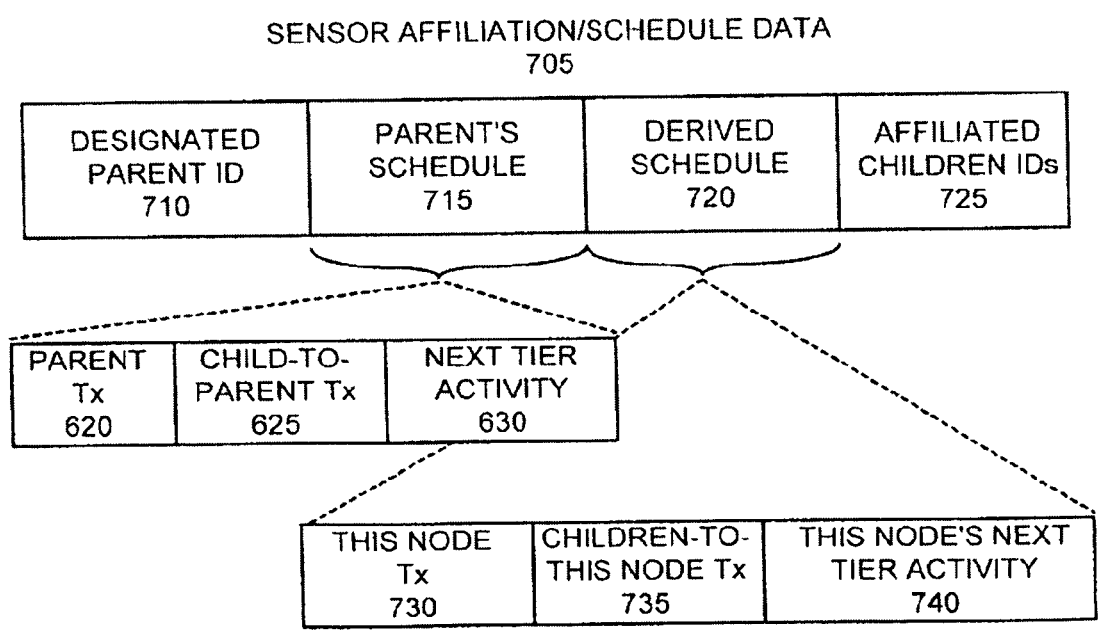
FIG. 7B illustrates exemplary sensor node affiliation/schedule data stored in the database of FIG. 7A consistent with the present invention.

FIG. 7B illustrates exemplary sensor affiliation/schedule data 705. Sensor affiliation/schedule data 705 may include "designated parent ID" data 710, "parent's schedule" data 715, "derived schedule" data 720, and "affiliated children IDs" data 725. "Designated parent ID" data 710 may include a unique identifier that identifies the "parent" node, in a lower tier of sensor network 110, to which sensor node 205 forwards messages. "Parent's schedule" data 715 may further include "parent Tx" data 620, "child-to-parent Tx" data 625 and "next tier activity" data 630. "Derived schedule" data 720 may further include "this node Tx" data 730, "children-to-this node Tx" data 735, and "this node's next tier activity" data 740. "This node Tx" data 730 may indicate a time at which sensor node 205 forwards messages to sensor nodes identified by "affiliated children IDs" data 725. "Children-to-this node Tx" data 735 may indicate times at which sensor nodes identified by "affiliated children IDs" data 725 may forward messages to sensor node 205. "This node's next tier activity" 740 may indicate one or more time periods allocated to sensor nodes in the next higher tier for transmitting and receiving messages.

Exemplary Schedule Message

Figure 8:
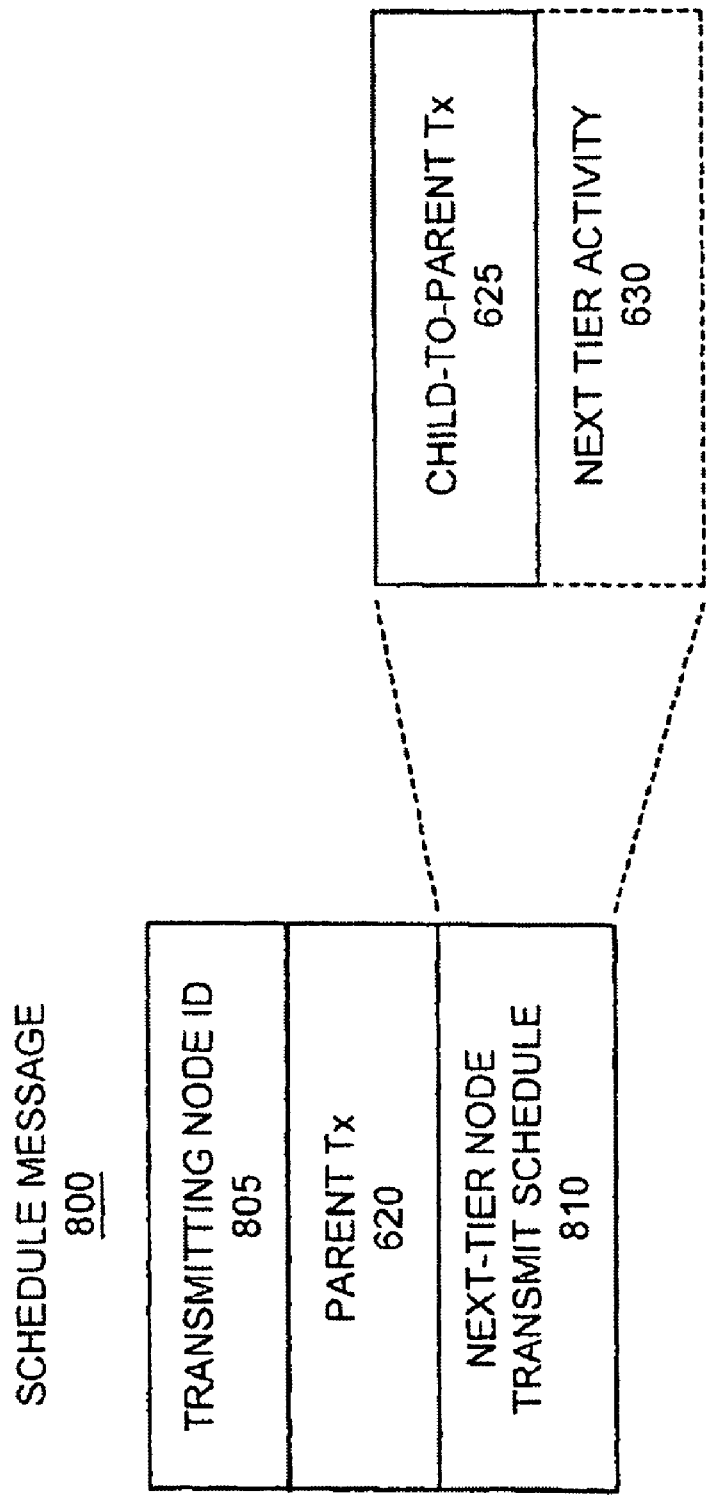
FIG. 8 illustrates an exemplary schedule message consistent with the present invention.

FIG. 8 illustrates an exemplary schedule message 800 that may be transmitted from a monitor point 105 or sensor node 205 for scheduling message transmit and receive times within sensor network 110. Schedule message 800 may include a number of data fields, including "transmitting node ID" data 805, "parent Tx" data 620, and "next-tier node transmit schedule" data 810. "Next-tier node transmit schedule" 810 may further include "child-to-parent Tx" data 625 and "next tier activity" data 630. "Transmitting node ID" data 805 may include a unique identifier of the monitor point 105 or sensor node 205 originating the schedule message 800.

Exemplary Transmit/Receive Scheduling

Figure 9:
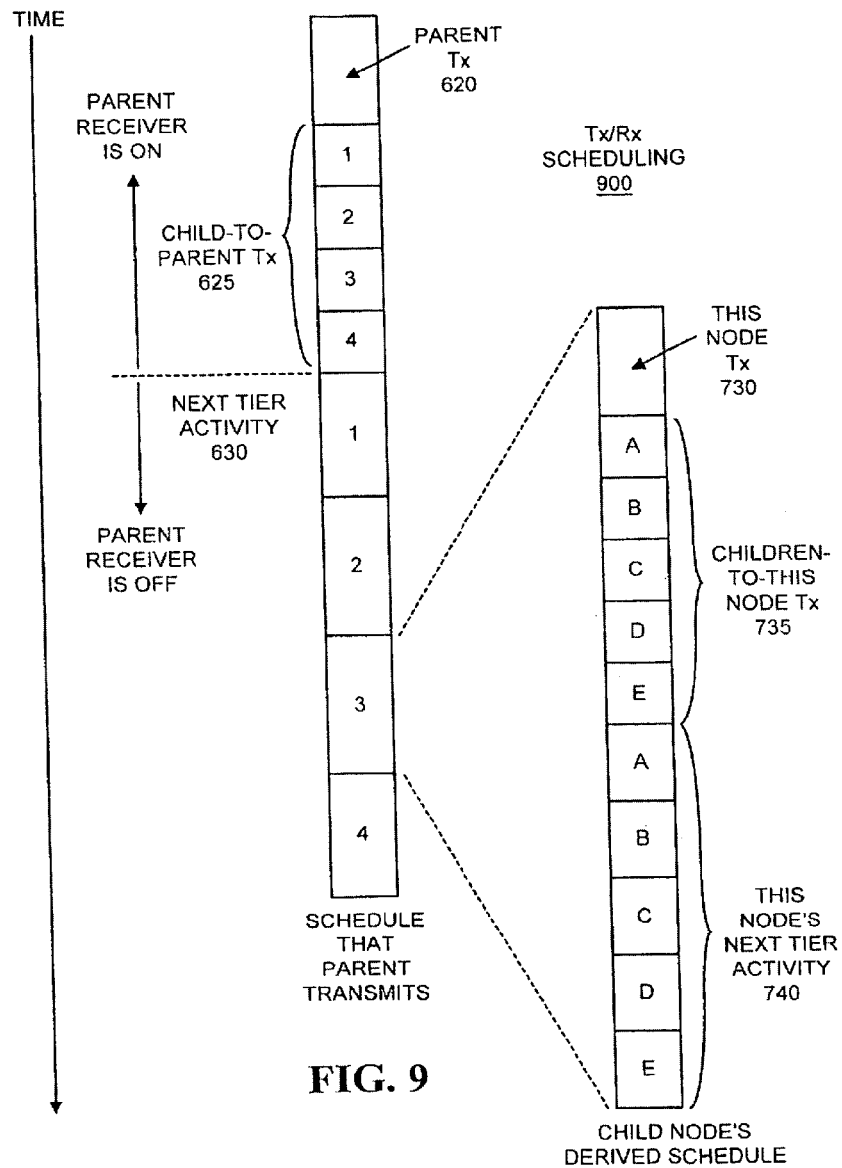
FIG. 9 illustrates exemplary transmit/receive scheduling consistent with the present invention.

FIG. 9 illustrates exemplary transmit/receive scheduling that may be employed at each sensor node 205 of network 110 according to schedule messages 800 received from "parent" nodes in a lower tier. The first time period shown on the scheduling timeline, Parent Tx time 620, may include the time period allocated by a "parent" node to transmitting messages from the "parent" node to its affiliated children. The time periods "child-to-parent Tx" 625 may include time periods allocated to each affiliated child of a parent node for transmitting messages to the parent node. During the "child-to-parent Tx" 625 time periods, the receiver of the parent node may be turned on to receive messages from the affiliated children.

The "next tier activity" 630 may include time periods allocated to each child of a parent node for transmitting messages to, and receiving messages from, each child's own children nodes. From the time periods allocated to the children of a parent node, each child may construct its own derived schedule. This derived schedule may include a time period, "this node Tx" 730 during which the child node may transmit to its own affiliated children. The derived schedule may further include time periods, "children-to-this node Tx" 735 during which these affiliated children may transmit messages to the parent's child node. The derived schedule may additionally include time periods, designated "this node's next tier activity" 740, that may be allocated to this node's children so that they may, in turn, construct their own derived schedule for their own affiliated children.

Exemplary Parent/Child Affiliation Processing

Figure 10:
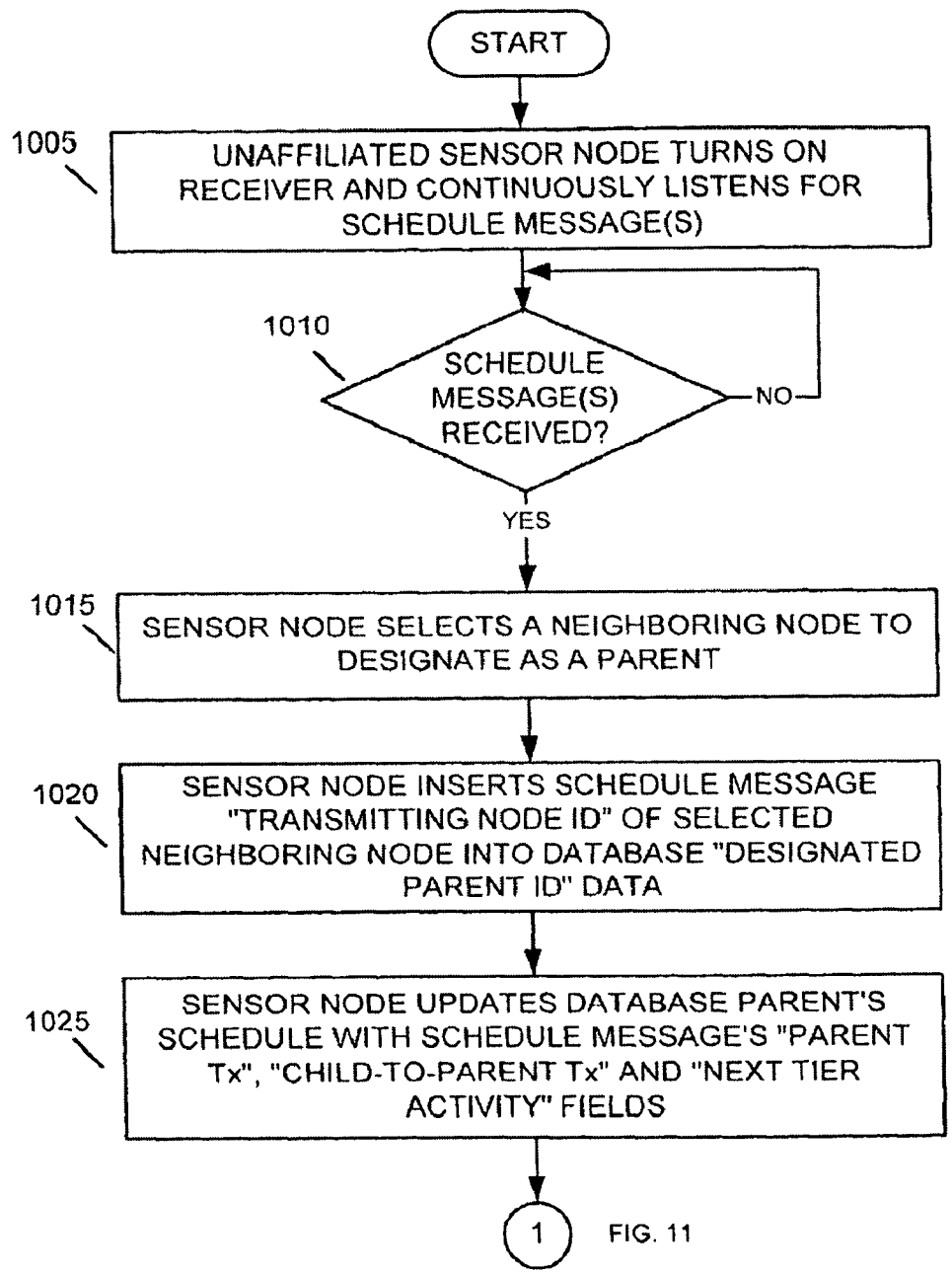
FIGS. 10-11 are flowcharts that illustrate parent/child affiliation processing consistent with the present invention.
Figure 11:
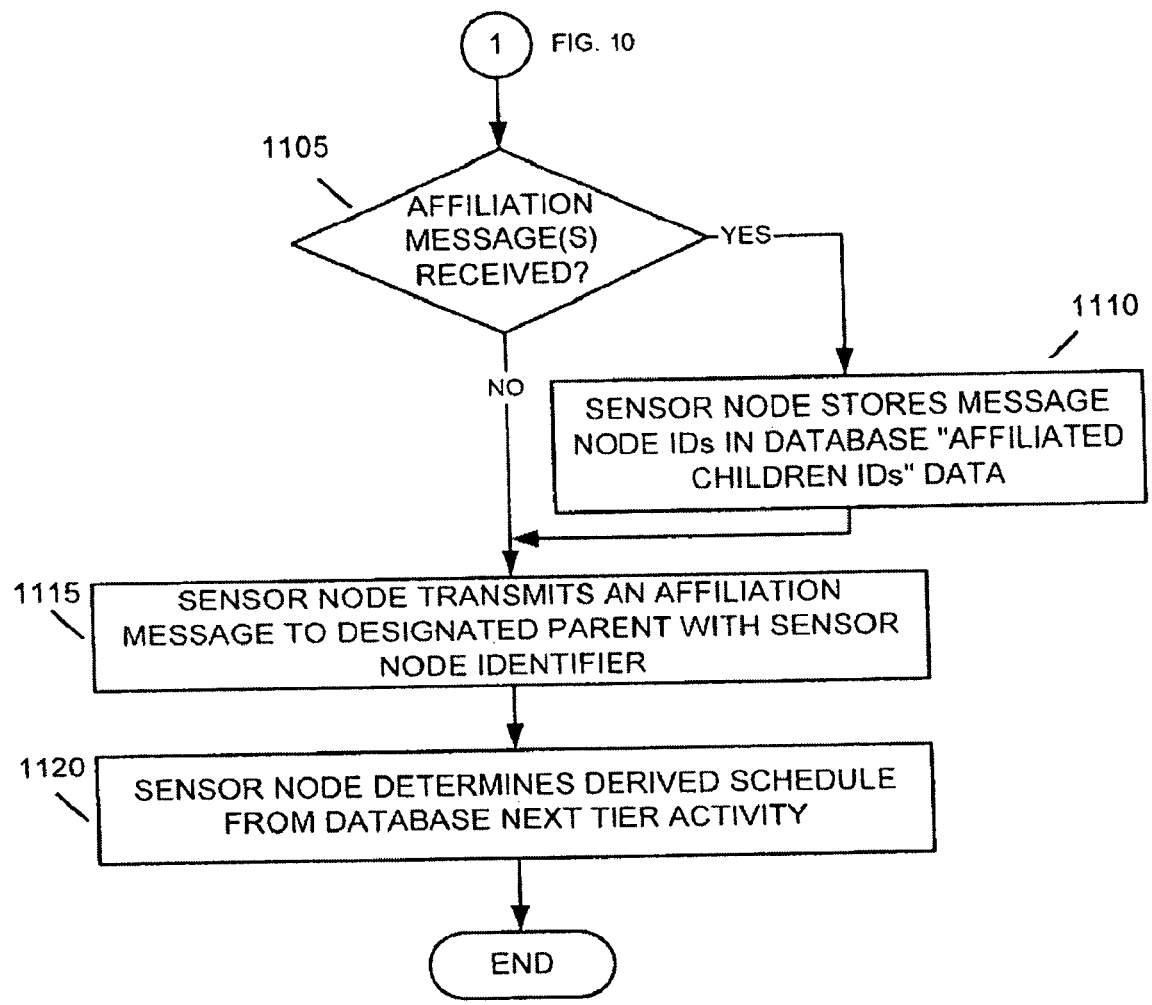

FIGS. 10-11 are flowcharts that illustrate exemplary processing, consistent with the present invention, for affiliating "child" sensor nodes 205 with "parent" nodes in a lower tier. Such "parent" nodes may include other sensor nodes 205 in sensor network 110 or monitor points 105. As one skilled in the art will appreciate, the method exemplified by FIGS. 10 and 11 can be implemented as a sequence of instructions and stored in memory 420 of sensor node 205 for execution by processing unit 415.

An unaffiliated sensor node 205 may begin parent/child affiliation processing by turning on its receiver 405 and continuously listening for schedule message(s) transmitted from a lower tier of sensor network 110 [step 1005] (FIG. 10). Sensor node 205 may be unaffiliated with any "parent" node if it has recently been powered on. Sensor node 205 may ago be unaffiliated if it has stopped receiving schedule messages from its "parent" node for a specified time period. If one or more schedule messages are received [step 1010], unaffiliated sensor node 205 may select a neighboring node to designate as a parent [step 1015]. For example, sensor node 205 may select a neighboring node whose transmit signal has the greatest strength or the least bit error rate (BER). Sensor node 205 may insert the "transmitting node ID" data 805 from the corresponding schedule message 800 of the selected neighboring node into the "designated parent ID" data 710 of database 700 [step 1020]. Sensor node 205 may then update database 700's "parent's schedule" data 715 with "parent Tx" data 620, "child-to-parent Tx" data 625, and "next tier activity" data 630 from the corresponding schedule message 800 of the selected neighboring node [step 1025].

Sensor node 205 may determine if any affiliation messages have been received from sensor nodes residing in higher tiers [step 1105] (FIG. 11). If so, sensor node 205 may store message node identifiers contained in the affiliation messages in database 700's "affiliation children IDs" data 725 [step 1110]. Sensor node 205 may also transmit an affiliation message to the node identified by "designated parent ID" data 710 in database 700 [step 1115]. Sensor node 205 may further determine a derived schedule from the "next tier activity" data 630 in database 700 [step 1120] and store in the "derived schedule" data 720.

Exemplary Monitor Point Message Processing

Figure 12:
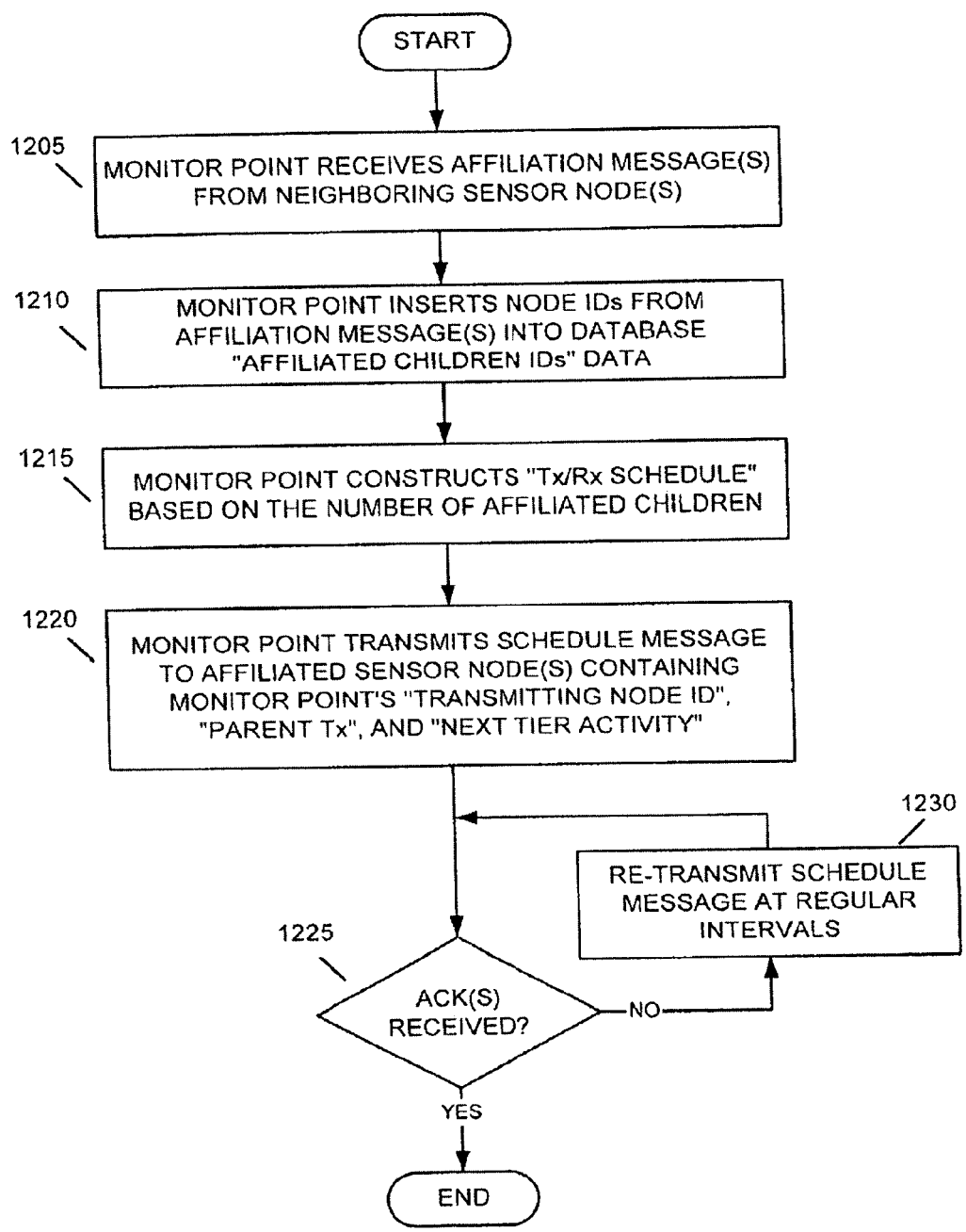
FIG. 12 is a flowchart that illustrates exemplary monitor point scheduling processing consistent with the present invention.
Figure 13:
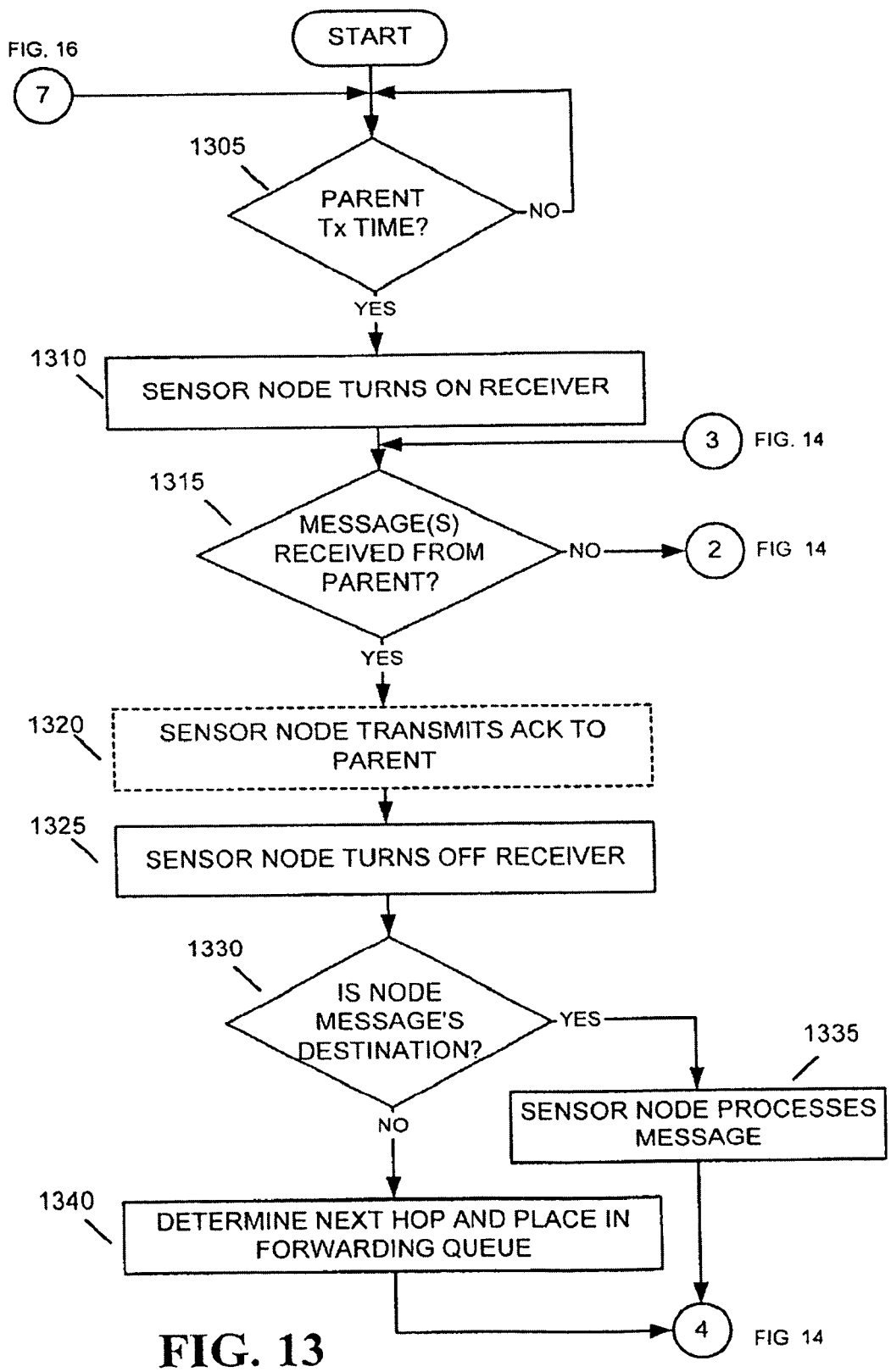
FIGS. 13-16 are flowcharts that illustrate sensor node schedule message processing consistent with the present invention.

FIG. 12 is a flowchart that illustrates exemplary processing, consistent with the present invention, for receiving affiliation messages and transmitting schedule messages at a monitor point 105. As one skilled in the art will appreciate, the method exemplified by FIG. 12 can be implemented as a sequence of instructions and stored in memory 520 of monitor point 105 for execution by processing unit 515.

Monitor point message processing may begin with a monitor point 105 receiving one or more affiliation messages from neighboring sensor nodes [step 1205] (FIG. 12). Monitor point 105 may insert the node identifiers from the received affiliation message(s) into database 600's "affiliation children IDs" data 610 [step 1210]. Monitor point 105 may construct the "Tx/Rx schedule" 615 based on the number of affiliated children indicated in "affiliated children IDs" data 610 [step 1215]. Monitor point 105 may then transmit a schedule message 800 to sensor nodes identified by "affiliated children IDs" data 610 containing monitor point 105's "transmitting node ID" data 805, "parent Tx" data 620, and "next-tier transmit schedule" data 810 [step 1220]. Schedule message 800 may be transmitted periodically using conventional multiple access mechanisms, such as, for example, Carrier Sense Multiple Access (CSMA). Subsequent to transmission of schedule message 800, monitor point 105 may determine if acknowledgements (ACKs) have been received from all affiliated children [step 1225]. If not, monitor point 105 may re-transmit the schedule message 800 at regular intervals until ACKs are received from all affiliated children [step 1230]. In this manner, monitor point 105 coordinates and schedules the power on/off intervals of the sensor nodes that is associated with (i.e., the nodes with which it transmits/receives data from).

Exemplary Message Reception/Transmission Processing

FIGS. 13-16 are flowcharts that illustrate exemplary processing, consistent with the present invention, for receiving and/or transmitting messages at a sensor node 205. As one skilled in the art will appreciate, the method exemplified by FIGS. 13-16 can be implemented as a sequence of instructions and stored in memory 420 of sensor node 205 for execution by processing unit 415. The exemplary reception and transmission of messages at a sensor node 205 as illustrated in FIGS. 13-16 is further demonstrated with respect to the exemplary messages transmission diagram illustrated in FIG. 17.

Figure 14:
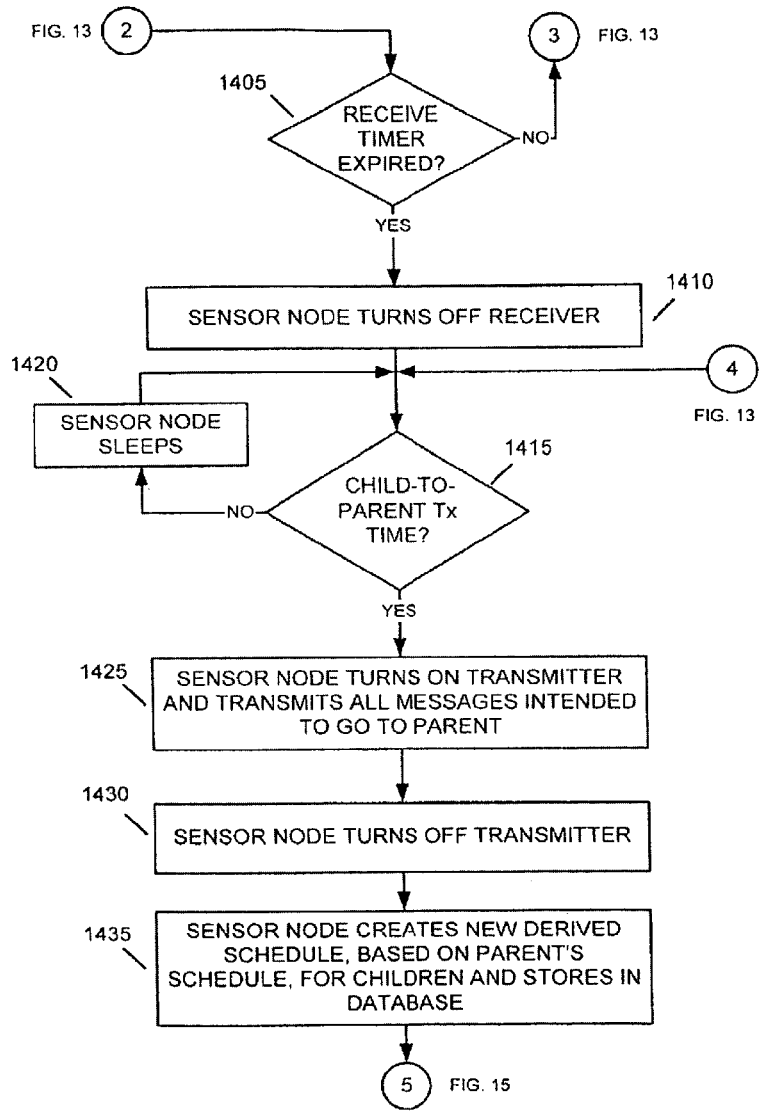

Sensor node 205 ("This node" 1710 of FIG. 17) may begin processing by determining if it is the next parent transmit time as indicated by clock 440 and the "parent Tx" data 620 of database 700 [step 1305]. If so, sensor node 205 may turn on receiver 405 [step 1310] (FIG. 13) and listen for messages transmitted from a parent (see also "Parent Node" 1705 of FIG. 17). If no messages are received, sensor node 205 determines if a receive timer has expired [step 1405] (FIG. 14). The receive timer may indicate a maximum time period that sensor node 205 (see "This Node" 1710 of FIG. 17) may listen for messages before turning off receiver 405. If the receive timer has not expired, processing may return to step 1315. If the receive timer has expired, sensor node 205 may turn off receiver 405 [step 1410]. If messages have been received (see "Parent TX" 620 of FIG. 17), sensor node 205 may, optionally, transmit an ACK to the parent node that transmitted the messages [step 1320]. Sensor node 205 may then turn off receiver 405 [step 1325].

Inspecting the received messages, sensor node 205 may determine if sensor node 205 is the destination of each of the received messages [step 1330]. If so, sensor node 205 may process the message [step 1335]. If not, sensor node 205 may determine a next hop in sensor network 110 for the message using conventional routing tables, and place the message in a forwarding queue [step 1340]. At step 1415, sensor node 205 may determine if it is time to transmit messages to the parent node as indicated by "child-to-parent Tx" data 625 of database 700 (see "child-to-parent Tx" 625 of FIG. 17). If not, sensor node 205 may sleep until clock 440 indicates that it is time to transmit messages to the parent node [step 1420]. If clock 440 and "child-to-parent Tx" data 625 indicate that it is time to transmit messages to the parent node, sensor node 205 may turn on transmitter 405 and transmit all messages intended to go to the node indicated by the "designated parent ID" data 710 of database 700 [step 1425]. After all messages are transmitted to the parent node, sensor node 205 may turn off transmitter 405 [step 1430].

Figure 15:
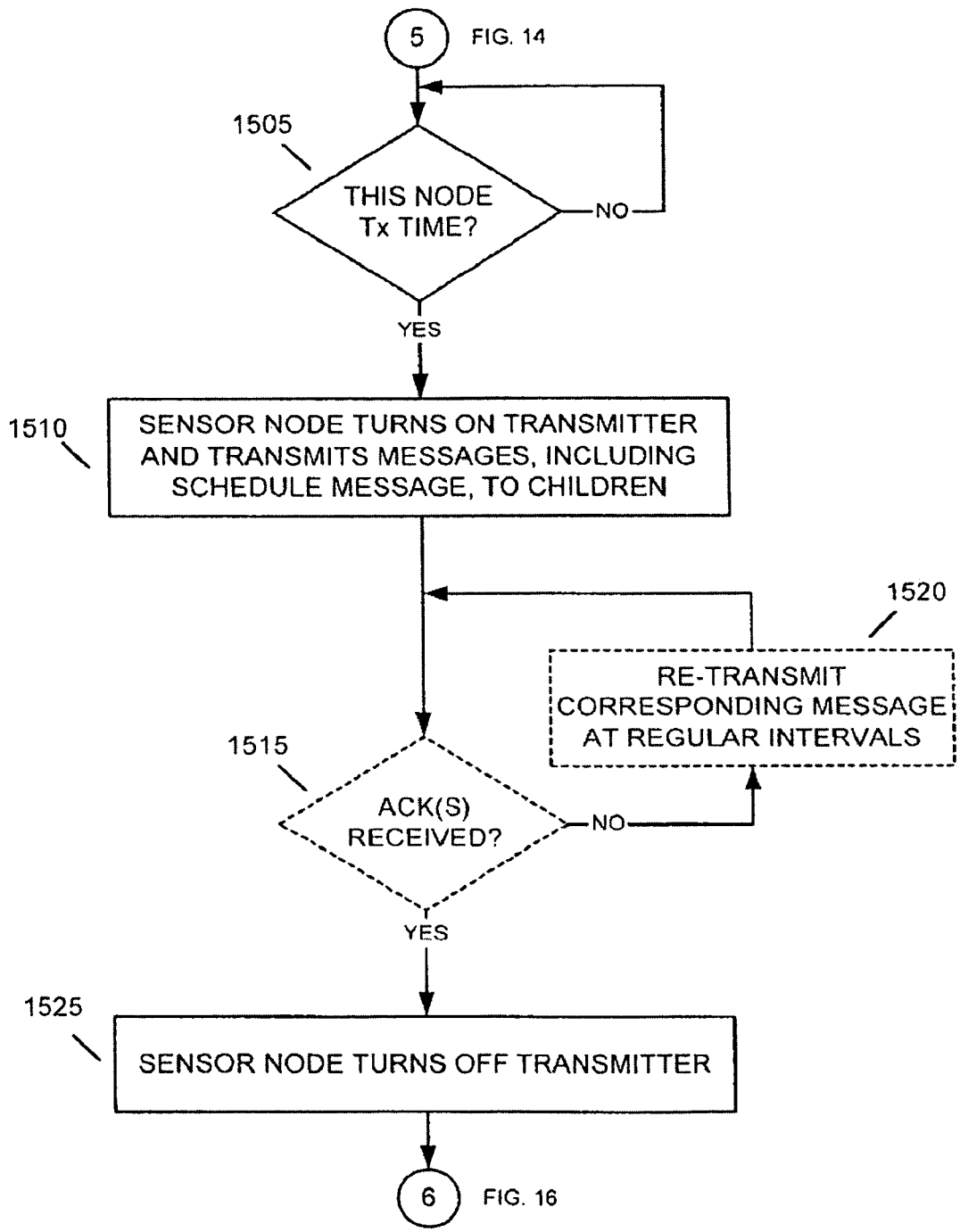
Figure 16:
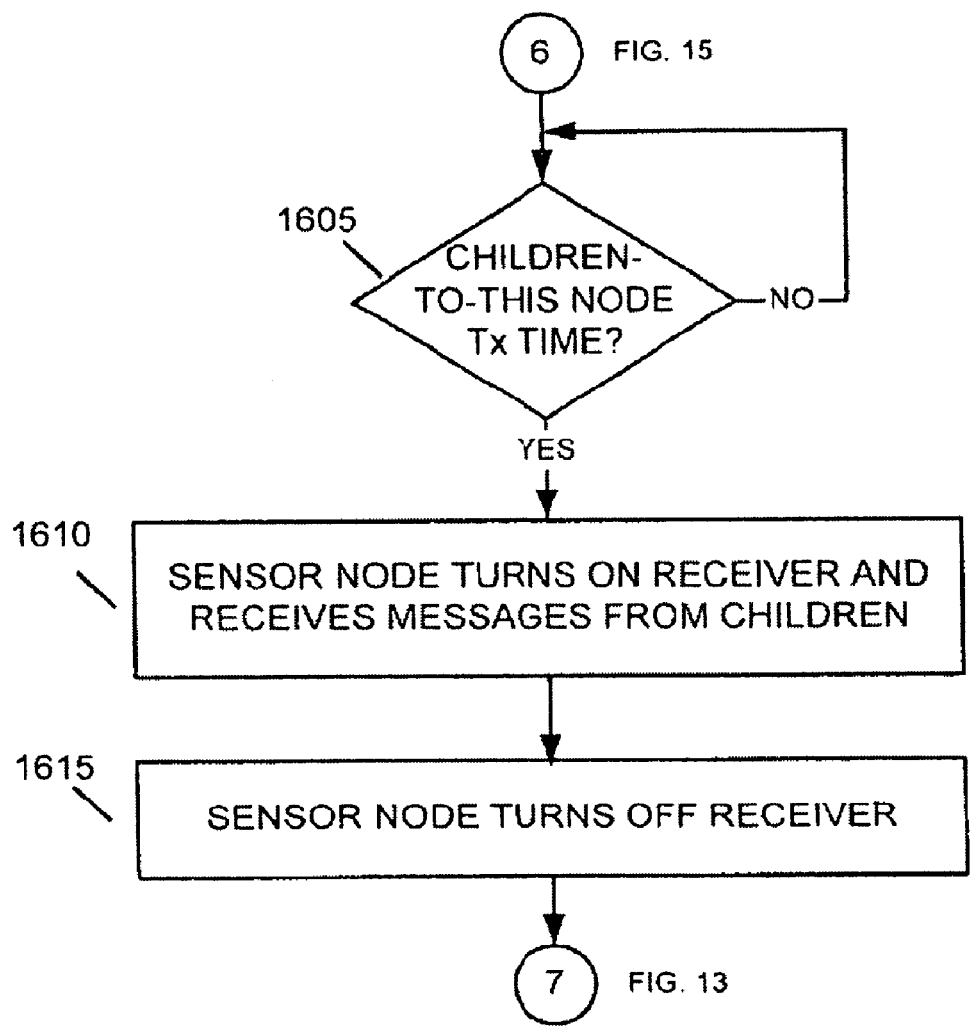
Figure 17:
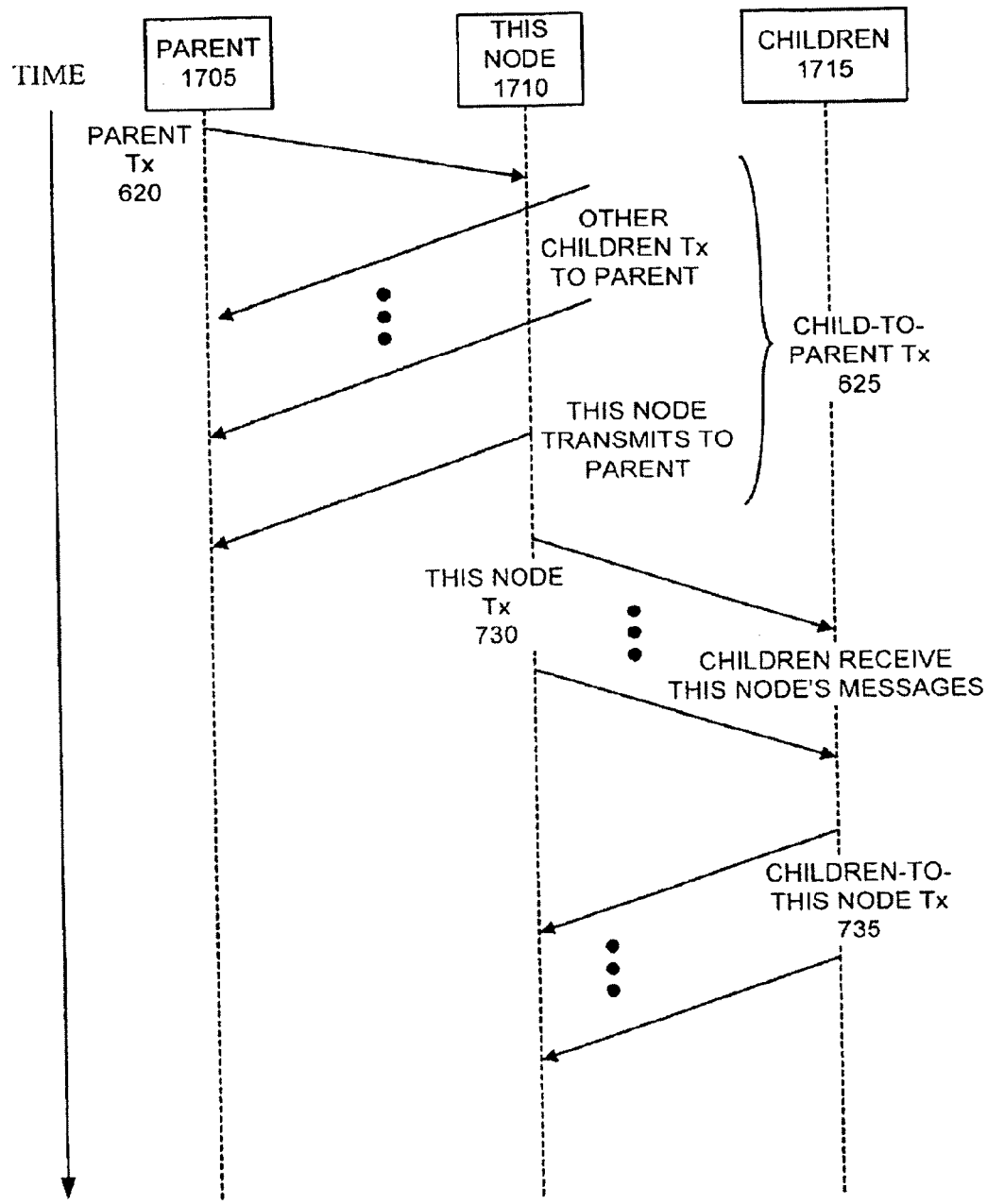
FIG. 17 illustrates an exemplary message transmission diagram consistent with the present invention.

Sensor node 205 may create a new derived schedule for it's children identified by "affiliated children IDs" data 725, based on the "parent's schedule" 715, and may then store the new derived schedule in the "derived schedule" data 720 of database 700 [step 1435]. Sensor node 205 may inspect the "this node Tx" data 730 of database 700 to determine if it is time to transmit to the sensor nodes identified by the "affiliated children IDs" data 725 [step 1505] (FIG. 15). If so, sensor node 205 may turn on transmitter 405 and transmit messages, including schedule messages, to its children [step 1510] (see "This Node Tx" 730, FIG. 17). For each transmitted message, sensor node 205 may, optionally, determine if an ACK is received [step 1515]. If not, sensor node 205 may further, optionally, re-transmit the corresponding message at a regular interval until an ACK is received [step 1520]. When all ACKs are received, sensor node 205 may turn off transmitter 405 [step 1525]. Sensor node 205 may then determine if it is time for its children to transmit to sensor node 205 as indicated by clock 440 and "children-to-this node Tx" data 735 of database 700 [step 1605] (FIG. 16). If so, sensor node 205 may turn on receiver 405 and receive one or messages from the children identified by the "affiliated children IDs" data 725 of database 700 [step 1610] (see "Children-to-this Node Tx" 735, FIG. 17). Sensor node 205 may then turn off receiver 405 [step 1615] and processing may return to step 1305 (HG. 13). In this manner, sensor nodes may power on and off their transmitters and receivers at appropriate times to conserve energy, while still performing their intended functions in network 100.

Exemplary Receiver Timing

Figure 18:
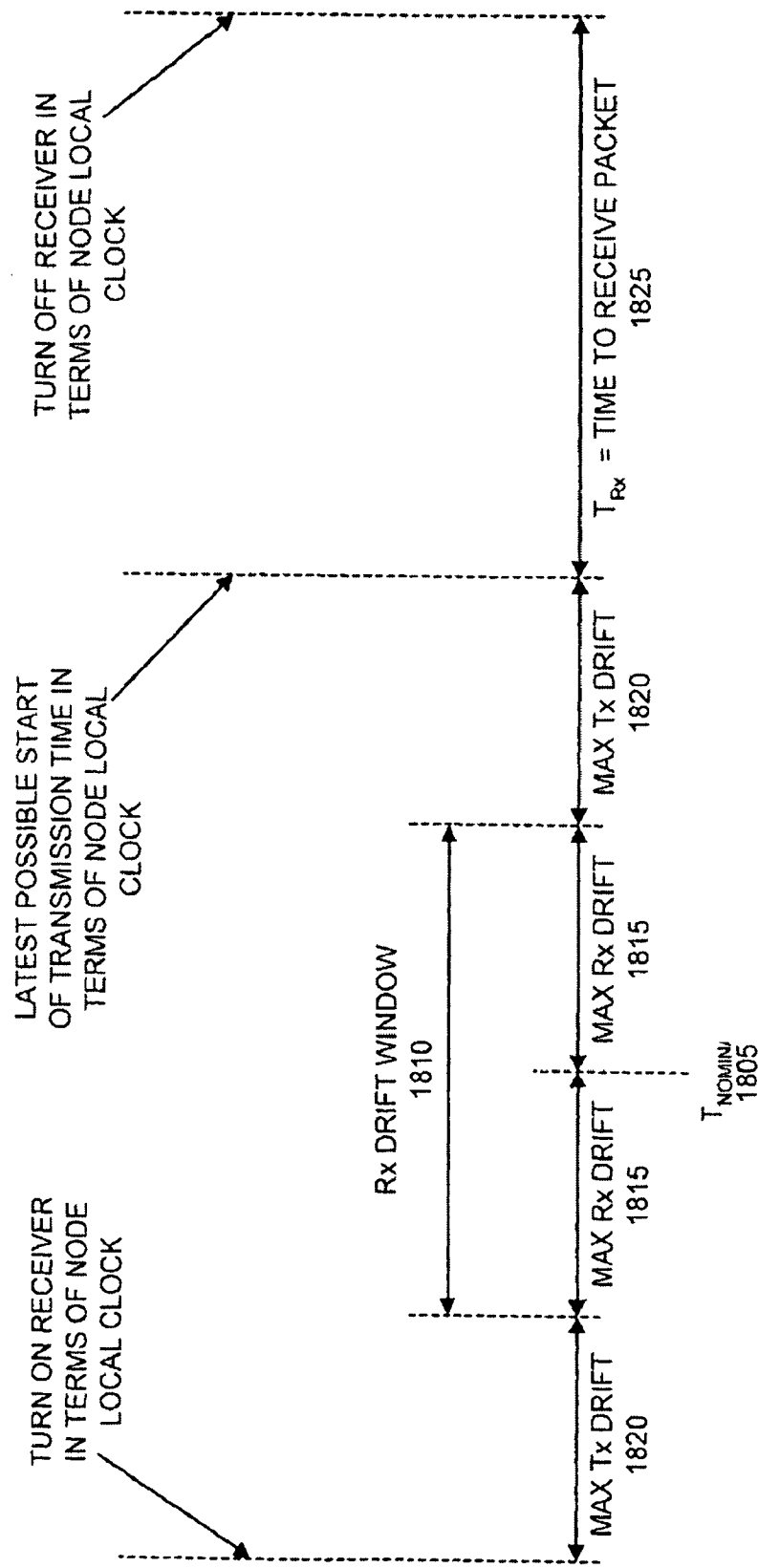
FIG. 18 illustrates exemplary node receiver timing consistent with the present invention.

FIG. 18 illustrates exemplary receiver timing when monitor points 105 or sensor nodes 205 of network 100 use internal clocks that may have inherent "clock drift." "Clock drift" occurs when internal clocks runs faster or slower then the true elapsed time and may be inherent in many types of internal clocks employed in monitor points 105 or sensor nodes 205. "Clock drift" may be taken into account when scheduling the time at which a node's receiver must be turned on, since both the transmitting node and the receiving node may both have drifting clocks. As shown in FIG. 18, $T_{nominal}$ 1805 represents the next time at which a receiver must be turned on based on scheduling data contained in the schedule message received from a parent node. A "Rx Drift Window" 1810 exists around this time which represents $T_{nominal}$ plus or minus the "Max Rx Drift" 1815 for this node over the amount of time remaining until $T_{nominal}$. If the transmitting node has zero clock drift, the receiving node should, thus, wake up at the beginning of its "Rx Drift Window" 1810.

The clock at the transmitting node may also incur clock drift, "Max Tx Drift" 1820, that must be accounted for at the receiving node when turning on and off the receiver. The receiving node should, thus, turn on its receiver at a local clock time that is "Max Tx Drift" 1820 plus "Max Rx Drift" 1815 before $T_{nominal}$. The receiving node should also turn off its receiver at a local clock time that is "Max Rx Drift" 1815 plus "Max Tx Drift" 1820 plus a maximum estimated time to receive a packet from the transmitting node ($T_{Rx}$ 1825). $T_{Rx}$ 1825 may include packet transmission time and packet propagation time. By taking into account maximum estimated clock drift at both the receiving node and transmitting node, monitor points 105 and sensor nodes 205 of sensor network 110 may successfully implement transmit/receive scheduling as described above with respect to FIGS. 1-17.

CONCLUSION

Systems and methods consistent with the present invention, therefore, provide mechanisms that enable sensor node transmitters and receivers to be turned off, and remain in a "sleep" state, for substantial periods, thus, increasing the energy efficiency of the nodes. Systems and methods consistent with the present invention further implement transmission and reception schedules that permit the reception and forwarding of packets containing routing, or other types of data, during short periods when the sensor node transmitters and receivers are powered up and, thus, "awake." The present invention, thus, increases sensor node operational life by reducing energy consumption while permitting the reception and forwarding of the routing messages needed to self-organize the distributed network.

The foregoing description of exemplary embodiments of the present invention provides illustration and description, but is not intended to be exhaustive or to limit the invention to the precise form disclosed. Modifications and variations are possible in light of the above teachings or may be acquired from practice of the invention. For example, while certain components of the invention have been described as implemented in hardware and others in software, other hardware/software configurations may be possible. Also, while series of steps have been described with regard to FIGS. 10-16, the order of the steps is not critical.

No element, act, or instruction used in the description of the present application should be construed as critical or essential to the invention unless explicitly described as such. Also, as used herein, the article "a" is intended to include one or more items. Where only one item is intended, the term "one" or similar language is used. The scope of the invention is defined by the following claims and their equivalents.

What is claimed is:

1. An apparatus with a non-transitory device-readable medium encoded with instructions, comprising:
    instructions capable of being used to cause storage of first data comprising one or more identifiers associated with one or more children nodes affiliated with a parent node in a network;
    instructions capable of being used to cause storage of second data comprising a first time schedule for communication of one or more first messages from the parent node to at least one of the one or more affiliated children nodes and a second time schedule for communication of one or more second messages to the parent node from at least one of the one or more affiliated children nodes;
    instructions capable of being used to cause storage of third data comprising an identifier associated with the parent node;
    instructions capable of being used to cause message communication, the message communication capable of being caused using the first data, the third data, and the second data comprising the first time schedule for communication of one or more first messages from the parent node to at least one of the one or more affiliated children nodes and the second time schedule for communication of one or more second messages to the parent node from at least one of the one or more affiliated children nodes, wherein the apparatus is configured such that a manner of the message communication is caused for power saving purposes by allowing at least one of the one or more affiliated children nodes to sleep, utilizing at least one of the first data or the second data;
    instructions capable of being used to cause communication of a scheduling message including at least one of the first data or the second data between the parent node and at least one of the one or more affiliated children nodes; and
    instructions capable of being used to cause a plurality of child/parent time slots associated with different ones of the affiliated children nodes to be temporally grouped together, wherein the apparatus is configured to cause the plurality of child/parent time slots associated with the different ones of the affiliated children nodes to be temporally adjacent.

2. The apparatus set forth in claim 1, further comprising: instructions capable of being used to cause storage of fourth data comprising a time schedule allocating times for the affiliated children nodes.

3. The apparatus set forth in claim 1, further comprising: instructions capable of being used to cause storage of fourth data comprising a time schedule allocating times for the affiliated children nodes to transmit third messages to, or receive fourth messages from, other children nodes.

4. The apparatus set forth in claim 1, wherein at least one of the one or more affiliated children nodes includes one or more sensor nodes.

5. The apparatus set forth in claim 1, wherein the apparatus is part of a system that includes a computer.

6. The apparatus set forth in claim 1, wherein the instructions capable of being used to cause storage of first data, the instructions capable of being used to cause storage of second data, and the instructions capable of being used to cause storage of third data, are software.

7. The apparatus set forth in claim 1, wherein the instructions capable of being used to cause storage of first data, the instructions capable of being used to cause storage of second data, and the instructions capable of being used to cause storage of third data, are embodied in hardware.

8. The apparatus set forth in claim 1, further comprising instructions capable of being used to cause at least one of the one or more affiliated children nodes to sleep, utilizing at least one of the first data or the second data.

9. The apparatus set forth in claim 1, wherein the instructions capable of being used to cause the message communication are adapted for use in an ad-hoc wireless network.

10. The apparatus set forth in claim 1, wherein the instructions capable of being used to cause the message communication are adapted for use in a multi-tier wireless network capable of including at least three tiers.

11. The apparatus set forth in claim 1, wherein the message communication includes transmitting the one or more first messages.

12. The apparatus set forth in claim 1, wherein the message communication includes receiving the one or more second messages.

13. The apparatus set forth in claim 1, wherein the apparatus is configured such that the scheduling message is communicated periodically.

14. The apparatus set forth in claim 1, wherein the apparatus is configured such that the scheduling message is communicated via a carrier sense multiple access (CSMA) technique.

15. The apparatus set forth in claim 1, further comprising instructions capable of being used to allow receipt of acknowledgements in response to the communication of the scheduling message.

16. The apparatus set forth in claim 1, wherein the apparatus is configured to operate as at least one of the affiliated children nodes and is configured to cooperate with an acoustic sensor.

17. The apparatus set forth in claim 1, wherein the apparatus is configured to operate as at least one of the affiliated children nodes and is configured to cooperate with a motion-detection sensor.

18. The apparatus set forth in claim 1, wherein the apparatus is configured to operate as at least one of the affiliated children nodes and is configured to cooperate with a radar sensor.

19. The apparatus set forth in claim 1, wherein the apparatus is configured to operate as at least one of the affiliated children nodes and is configured to cooperate with a sensor that detects one or more chemicals.

20. The apparatus set forth in claim 1, wherein the apparatus is configured to operate as at least one of the affiliated children nodes and is configured to cooperate with a visual sensor.

21. The apparatus set forth in claim 1, wherein the apparatus is configured to operate as at least one of the affiliated children nodes includes a visual sensor that is capable of being used to record moving images.

22. The apparatus set forth in claim 1, wherein the apparatus is configured to operate as at least one of the affiliated children nodes and is configured to cooperate with a thermal sensor.

23. The apparatus set forth in claim 1, wherein the apparatus is configured to operate as at least one of the affiliated children nodes and is configured to cooperate with a sensor that detects nuclear radiation or a biological agent.

24. The apparatus set forth in claim 1, wherein the network includes a local area network.

25. The apparatus set forth in claim 1, wherein the apparatus is operable to buffer data.

26. The apparatus set forth in claim 1, wherein the apparatus is configured to operate as the parent node and is included as a component of a system.

27. The apparatus set forth in claim 26, wherein the system further includes a plurality of the affiliated children nodes.

28. The apparatus set forth in claim 27, wherein at least one of the affiliated children nodes includes an acoustic sensor.

29. The apparatus set forth in claim 27, wherein at least one of the affiliated children nodes includes a motion-detection sensor.

30. The apparatus set forth in claim 27, wherein at least one of the affiliated children nodes includes a radar sensor.

31. The apparatus set forth in claim 27, wherein at least one of the affiliated children nodes includes a sensor that detects one or more chemicals.

32. The apparatus set forth in claim 27, wherein at least one of the affiliated children nodes includes a visual sensor.

33. The apparatus set forth in claim 27, wherein at least one of the affiliated children nodes includes a visual sensor that is capable of being used to record moving images.

34. The apparatus set forth in claim 27, wherein at least one of the affiliated children nodes includes a thermal sensor.

35. The apparatus set forth in claim 27, wherein at least one of the affiliated children nodes includes a sensor that detects nuclear radiation or a biological agent.

36. The apparatus set forth in claim 1, further comprising instructions for allowing receipt of acknowledgements in response to the communication of information.

37. The apparatus set forth in claim 1, further comprising instructions capable of being used to allow receipt, at a particular node, a first powering-on schedule from another node in the network.

38. The apparatus set forth in claim 37, further comprising instructions capable of being used to selectively power-on at least one of a transmitter or a receiver based on the received first powering-on schedule.

39. The apparatus set forth in claim 38, further comprising instructions capable of being used to cause production of a second powering-on schedule based on the first powering-on schedule.

40. The apparatus set forth in claim 39, further comprising instructions capable of being used to cause transmission of the second powering-on schedule from the particular node to one or more other nodes in the network.

41. The apparatus set forth in claim 39, further comprising instructions capable of being used to cause transmission of the second powering-on schedule from the particular node to one or more other nodes in the network when the transmitter is in a powered-on state.

42. The apparatus set forth in claim 1, wherein the network comprises an ad-hoc, multi-node wireless network.

43. The apparatus set forth in claim 1, wherein the network comprises a wireless sensor network.

44. The apparatus set forth in claim 1, further comprising instructions capable of being used to cause organization of the network into a hierarchy of tiers.

45. The apparatus set forth in claim 44, wherein the network includes a sensor network.

46. The apparatus set forth in claim 44, further comprising instructions capable of being used to cause communication of the scheduling message throughout the network.

47. The apparatus set forth in claim 46, wherein the scheduling message includes a transmit scheduling message.

48. The apparatus set forth in claim 46, wherein the scheduling message includes a receive scheduling message.

49. The apparatus set forth in claim 46, further comprising instructions capable of being used to cause transmission or receipt of data messages between nodes in adjacent tiers based on the scheduling message.

50. The apparatus set forth in claim 46, wherein the scheduling message comprises time schedules for powering-on and powering-off transmitters and receivers at each of a plurality of nodes in adjacent tiers.

51. The apparatus set forth in claim 46, wherein the scheduling message comprises time schedules for powering-on transmitters or receivers at each of a plurality of nodes in adjacent tiers.

52. The apparatus set forth in claim 44, wherein the apparatus is operable such that at least one child node in a tier of the network receives third messages from children nodes in a higher tier.

53. The apparatus set forth in claim 52, wherein the third messages include data messages.

54. The apparatus set forth in claim 53, wherein a destination of the data messages comprises at least one data collection point.

55. The apparatus set forth in claim 54, wherein the at least one data collection point resides in a lowest tier of the network.

56. The apparatus set forth in claim 52, wherein the apparatus is operable such that the at least one child node forwards the third messages to a sensor node in a lower tier.

57. The apparatus set forth in claim 1, wherein the apparatus is operable as at least one of the one or more affiliated children nodes that is an intermediate node on a path between one or more other nodes and the parent node.

58. The apparatus set forth in claim 57, further comprising instructions capable of being used to cause powering-on, at the intermediate node, a receiver to listen for the scheduling message.

59. The apparatus set forth in claim 57, further comprising instructions capable of being used to allow receipt of the scheduling message from the parent node in the network.

60. The apparatus set forth in claim 59, wherein the scheduling message specifies a communication schedule that indicates times at which the intermediate and parent nodes may communicate with one another.

61. The apparatus set forth in claim 59, wherein the scheduling message specifies a communication schedule that indicates times at which the intermediate node may communicate with each of the one or more other nodes.

62. The apparatus set forth in claim 57, further comprising instructions capable of being used to cause organization of the intermediate node, the parent node, and the one or more other nodes in the network into a hierarchy of tiers.

63. The apparatus set forth in claim 57, further comprising instructions capable of being used to cause transmission of data messages to the one or more nodes in a lower tier of the network when a transmitter is powered-on.

64. The apparatus set forth in claim 57, further comprising instructions capable of being used to cause communication of the scheduling message to the parent node in a higher tier of the network when a transmitter is powered-on.

65. The apparatus set forth in claim 1, further comprising instructions capable of being used to allow receipt of third messages from neighboring nodes in a network notifying of the neighboring nodes' presence in the network.

66. The apparatus set forth in claim 65, further comprising instructions capable of being used to cause determination of a first communication schedule that indicates times for communicating with each of the neighboring nodes and a second communication schedule that indicates times for each of the neighboring nodes to communicate with other nodes in the network.

67. The apparatus set forth in claim 66, further comprising instructions capable of being used to cause communication of the scheduling message to each of the neighboring nodes, wherein the scheduling message includes the first communication schedule and the second communication schedule.

68. The apparatus set forth in claim 1, wherein at least one of the one or more first messages or the second messages includes the scheduling message.

69. The apparatus set forth in claim 1, wherein at least one of the one or more first messages or the second messages includes a data message.

70. The apparatus set forth in claim 1, wherein the instructions capable of being used to cause storage of first data, the instructions capable of being used to cause storage of second data, and the instructions capable of being used to cause message communication are stored in random access memory.

71. The apparatus set forth in claim 1, wherein the instructions capable of being used to cause storage of first data, the instructions capable of being used to cause storage of second data, and the instructions capable of being used to cause message communication are stored in read only memory.

72. The apparatus set forth in claim 1, wherein the instructions capable of being used to cause storage of first data, the instructions capable of being used to cause storage of second data, and the instructions capable of being used to cause message communication are stored in permanent storage.

73. The apparatus set forth in claim 1, wherein the instructions capable of being used to cause storage of first data, the instructions capable of being used to cause storage of second data, and the instructions capable of being used to cause message communication are stored in semi-permanent storage.

74. The apparatus set forth in claim 1, wherein the instructions capable of being used to cause storage of first data, the instructions capable of being used to cause storage of second data, and the instructions capable of being used to cause message communication are stored in temporary storage.

75. The apparatus set forth in claim 1, wherein the instructions capable of being used to cause storage of first data are operable to cause the storage of the first data in response to receipt of a particular message.

76. The apparatus set forth in claim 1, wherein the instructions capable of being used to cause storage of second data are operable to cause the storage of the second data in response to receipt of a particular message.

77. The apparatus set forth in claim 76, wherein the particular message includes an affiliation message.

78. The apparatus set forth in claim 1, wherein the apparatus is operable such that clock drift is counteracted.

79. The apparatus set forth in claim 1, wherein the second data further comprises next-tier information.

80. The apparatus set forth in claim 79, wherein the next-tier information includes times at which at least one of the one or more affiliated children nodes transmit third messages to, or receive fourth messages from, their affiliated children.

81. The apparatus set forth in claim 1, further comprising instructions capable of being used to cause identification of link quality.

82. The apparatus set forth in claim 81, wherein the link quality is identified based on a signal strength.

83. The apparatus set forth in claim 81, wherein the link quality is identified based on an error rate.

84. The apparatus set forth in claim 81, further comprising instructions capable of being used to cause selection of a particular node based on the identified link quality.

85. The apparatus set forth in claim 1, wherein the second data is generated based on a number of the affiliated children nodes.

86. The apparatus set forth in claim 1, wherein the first data and the second data are components of a same data structure encoded on the device-readable medium.

87. The apparatus set forth in claim 1, wherein the first time schedule is for only communicating the one or more first messages from the parent node to the at least one of the one or more affiliated children nodes.

88. The apparatus set forth in claim 1, wherein the second time schedule is for only communicating the one or more second messages to the parent node from the at least one of the one or more affiliated children nodes.

89. The apparatus set forth in claim 1, wherein the first time schedule and the second time schedule are components of a same data structure encoded on the device-readable medium.

90. The apparatus set forth in claim 1, wherein the instructions capable of being used to cause storage of first data and the instructions capable of being used to cause storage of second data, are stored on the apparatus which is operable to function as the parent node.

91. The apparatus set forth in claim 1, wherein the instructions capable of being used to cause storage of first data and the instructions capable of being used to cause storage of second data, are stored on the apparatus which is operable to function as one of the one or more affiliated children nodes.

92. The apparatus set forth in claim 1, wherein the second time schedule is for receiving the one or more second messages at the parent node from each of the one or more affiliated children nodes.

93. The apparatus set forth in claim 1, further comprising instructions capable of being used to cause utilization of the scheduling message.

94. The apparatus set forth in claim 93, further comprising instructions capable of being used to cause powering-on a receiver to listen for the scheduling message.

95. The apparatus set forth in claim 1, wherein the apparatus is operable to communicate with other nodes in a public land mobile network.

96. The apparatus set forth in claim 1, wherein the apparatus is operable to communicate with other nodes in a public switched telephone network.

97. The apparatus set forth in claim 1, wherein the apparatus is operable to communicate with other nodes in a metropolitan area network.

98. The apparatus set forth in claim 1, wherein the apparatus is operable to communicate with other nodes in a local area network.

99. The apparatus set forth in claim 1, wherein the apparatus is operable to communicate with other nodes in a general packet radio service network.

100. The apparatus set forth in claim 1, wherein the apparatus is operable to communicate with other nodes in a cellular digital packet data network.

101. The apparatus set forth in claim 1, wherein the apparatus is operable such that at least a portion of the second data is generated by the parent node.

102. The apparatus set forth in claim 1, wherein the apparatus is operable such that at least a portion of the second data is generated by one of the one or more affiliated children nodes.

103. The apparatus set forth in claim 1, wherein the apparatus is operable such that the first time schedule of the second data is allocated by the parent node.

104. The apparatus set forth in claim 1, wherein the apparatus is operable such that at least one aspect of a communication schedule is allocated by one of the one or more affiliated children nodes.

105. The apparatus set forth in claim 1, wherein the apparatus is operable such that the second time schedule of the second data is allocated by the parent node.

106. The apparatus set forth in claim 1, wherein the apparatus is operable such that at least a portion of the second data includes a derived schedule.

107. The apparatus set forth in claim 1, wherein the apparatus is capable of operating as a parent node.

108. The apparatus set forth in claim 1, wherein the apparatus is capable of operating as a child node of the one or more children nodes.

109. The apparatus set forth in claim 108, wherein the child node includes a timer for dictating when a receiver of the child node is turned off.

110. The apparatus set forth in claim 108, wherein the child node includes a timer for dictating a maximum time when a receiver of the child node is turned off.

111. The apparatus set forth in claim 1, wherein the sleep includes a powering off operation.

112. The apparatus set forth in claim 1, wherein the communication of the scheduling message includes receiving the scheduling message.

113. The apparatus set forth in claim 1, wherein the communication of the scheduling message includes transmitting the scheduling message.

114. The apparatus set forth in claim 1, wherein the scheduling message is communicated by being transmitted from the parent node to at least one of the one or more affiliated children nodes.

115. The apparatus set forth in claim 1, wherein the scheduling message includes the first data.

116. The apparatus set forth in claim 1, wherein the scheduling message includes the second data.

117. The apparatus set forth in claim 1, wherein the apparatus is operable to cause at least one of the one or more affiliated children nodes to sleep.

118. The apparatus set forth in claim 1, wherein the child/parent time slots include child-to-parent time slots.

119. The apparatus set forth in claim 1, wherein the child/parent time slots include parent-to-child time slots.

120. The apparatus set forth in claim 1, wherein the apparatus is configured such that the manner of the message communication is caused for power saving purposes by allowing at least one of the one or more affiliated children nodes to sleep, utilizing both the first data and the second data.

121. The apparatus set forth in claim 1, wherein the first time schedule is for transmitting the one or more first messages from the parent node to more than one of the affiliated children nodes and the second time schedule is for receiving the one or more second messages at the parent node from more than one of the affiliated children nodes.

122. The apparatus set forth in claim 1, wherein a first one of the child/parent time slots associated with a first one of the affiliated children nodes and a second one of the child/parent time slots associated with a second one of the affiliated children nodes are temporally adjacent, with at least one signal therebetween.

123. The apparatus set forth in claim 122, wherein the at least one signal is associated with a slot for other data.

124. The apparatus set forth in claim 122, wherein the at least one signal includes data associated with a third one of the child/parent time slots associated with a third one of the affiliated children nodes.

125. The apparatus set forth in claim 1, wherein the apparatus is operable such that the scheduling message includes both the first data and the second data.

126. The apparatus set forth in claim 1, wherein the apparatus is configured such that the plurality of child/parent time slots associated with the different ones of the affiliated children nodes are temporally contiguous.

127. The apparatus set forth in claim 1, wherein the allowing at least one of the one or more affiliated children nodes to sleep includes causing at least one of the one or more affiliated children nodes to sleep.

128. The apparatus set forth in claim 1, further comprising instructions capable of being used to cause storage of fourth data comprising a time schedule allocating times for a plurality of the affiliated children nodes.

129. The apparatus set forth in claim 1, wherein the apparatus is operable to communicate with other nodes in a cellular network.

130. The apparatus set forth in claim 1, wherein the one or more identifiers associated with the one or more children nodes include one or more unique identifiers.

131. The apparatus set forth in claim 1, wherein the identifier associated with the parent node includes a unique identifier.

132. The apparatus set forth in claim 1, wherein the one or more identifiers associated with the one or more children nodes include one or more identifiers of the one or more children nodes.

133. The apparatus set forth in claim 1, wherein the identifier associated with the parent node includes an identifier of the parent node.

134. The apparatus set forth in claim 1, wherein the one or more identifiers associated with the one or more children nodes are unique to the one or more children nodes.

135. The apparatus set forth in claim 1, wherein the identifier associated with the parent node is unique to the parent node.

136. The apparatus set forth in claim 1, wherein at least one of the first time schedule or the second time schedule indicates a time.

137. The apparatus set forth in claim 1, wherein at least one of the first time schedule or the second time schedule indicates a time period.

138. The apparatus set forth in claim 1, wherein at least one of the first time schedule or the second time schedule indicates a maximum time period.

139. The apparatus set forth in claim 1, wherein at least one of the first time schedule or the second time schedule indicates a time to start the message communication.

140. The apparatus set forth in claim 1, wherein at least one of the first time schedule or the second time schedule indicates a time to power-off a component of the apparatus.

141. The apparatus set forth in claim 1, wherein the instructions include computer code.

142. The apparatus set forth in claim 1, wherein the apparatus is operable such that the second data includes first schedule data received by the apparatus from at least one other node and second schedule data generated by the apparatus.

143. The apparatus set forth in claim 1, wherein at least one of the first time schedule or the second time schedule indicates a time to operate a component of the apparatus.

144. The apparatus set forth in claim 1, wherein at least one of the first time schedule or the second time schedule indicates a time to power-on a component of the apparatus.

145. An apparatus with a non-transitory device-readable medium, comprising:
- instructions capable of being used to cause storage of first data comprising identifiers of children nodes affiliated with a parent node in a network, wherein the apparatus is operable such that at least one of the affiliated children nodes is capable of serving as an intermediate node on a path between one or more other nodes and the parent node;
- instructions capable of being used to cause storage of second data comprising a first time schedule for communication of first messages from the parent node to one or more of the affiliated children nodes and a second time schedule for communication of second messages to the parent node from one or more of the affiliated children nodes;
- instructions capable of being used to cause storage of third data comprising an identifier for the parent node;
- instructions capable of being used to cause message communication, the message communication capable of being performed using the first data, the third data, and the second data comprising the first time schedule for communication of the first messages from the parent node to one or more of the affiliated children nodes and the second time schedule for communication of the second messages to the parent node from one or more of the affiliated children nodes;
- instructions capable of being used to cause a plurality of child-to-parent time slots associated with different ones of the affiliated children nodes to be temporally grouped together; and
- instructions capable of being used to allow receipt of a scheduling message from the parent node in the network, wherein the scheduling message specifies a first communication schedule that indicates times at which the intermediate and parent nodes may communicate with one another, and a second communication schedule that indicates times at which the intermediate node may communicate with each of the one or more other nodes.

146. The apparatus set forth in claim 145, further comprising instructions capable of being used to cause selective powering-on and powering-off of a receiver or a transmitter based on the first or second communication schedules.

* * * * *